(12) United States Patent
Oyama et al.

(10) Patent No.: US 10,425,495 B2
(45) Date of Patent: Sep. 24, 2019

(54) COMMUNICATION DEVICE, COMMUNICATION METHOD, AND NON-TRANSITORY COMPUTER READABLE MEDIUM FOR CONTENT CACHE FUNCTION

(71) Applicant: KABUSHIKI KAISHA TOSHIBA, Minato-ku, Tokyo (JP)

(72) Inventors: Yuichiro Oyama, Tokyo (JP); Takahiro Yamaura, Kawasaki Kanagawa (JP); Takeshi Ishihara, Yokohama Kanagawa (JP); Kensaku Yamaguchi, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 43 days.

(21) Appl. No.: 15/445,535

(22) Filed: Feb. 28, 2017

(65) Prior Publication Data
US 2018/0063272 A1 Mar. 1, 2018

(30) Foreign Application Priority Data
Aug. 31, 2016 (JP) .................. 2016-169972

(51) Int. Cl.
*H04L 29/08* (2006.01)
*H04W 88/08* (2009.01)
(Continued)

(52) U.S. Cl.
CPC ...... *H04L 67/2842* (2013.01); *G06F 16/9574* (2019.01); *G06Q 30/02* (2013.01); *H04W 88/08* (2013.01)

(58) Field of Classification Search
CPC ..... H04L 67/10; H04L 67/16; H04L 67/1008; H04L 67/2842; H04L 47/29; H04N 21/2665
(Continued)

(56) References Cited

U.S. PATENT DOCUMENTS 7,542,477 B2 * 6/2009 Yoshizawa ......... H04N 7/17318
370/401
8,589,477 B2 11/2013 Osuga
(Continued)

FOREIGN PATENT DOCUMENTS

JP 2002-49766 2/2002
JP 2002-351772 12/2002
(Continued)

OTHER PUBLICATIONS

Khan SU, Khan R, Ali A. Implementation of Content Centric Networks Through Domain Name System. In2015 International Conference on Emerging Technologies (ICET) Dec. 19, 2015 (pp. 1-6). IEEE. (Year: 2015).*
(Continued)

*Primary Examiner* — Ranodhi Serrao
*Assistant Examiner* — James N Fiorillo
(74) *Attorney, Agent, or Firm* — Knobbe, Martens, Olson & Bear LLP

(57) ABSTRACT

A communication device includes: processing circuitry and communication circuitry. The processing circuitry acquires first information related to one or more pieces of content cached in each of relay devices being capable of communicating with a server and are capable of exchanging any of the pieces of content cached therein with one another. The processing circuitry acquires a first content list including an identifier of each of a plurality of pieces of content stored in the server. The processing circuitry specifies, on a basis of the first information, an identifier of a piece of content cached in at least one of the relay devices among the first content list and generates a second content list including the specified identifier and second information indicating that the piece of content identified by the specified identifier is
(Continued)

cached in at least one of the relay devices. The communication circuitry transmits the second content list.

9 Claims, 19 Drawing Sheets

(51) Int. Cl.
  *G06Q 30/02* (2012.01)
  *G06F 16/957* (2019.01)
(58) Field of Classification Search
  USPC ............... 709/203, 204, 213, 214, 218, 240
  See application file for complete search history.

(56) References Cited

U.S. PATENT DOCUMENTS

| | | | |
|---|---|---|---|
| 2002/0016162 A1 | 2/2002 | Yoshihara et al. | |
| 2003/0028616 A1* | 2/2003 | Aoki | H04L 47/10 709/217 |
| 2003/0204602 A1* | 10/2003 | Hudson | D01D 5/423 709/228 |
| 2008/0320151 A1* | 12/2008 | McCanne | H03M 7/30 709/228 |
| 2011/0035441 A1 | 2/2011 | Osuga | |
| 2011/0072084 A1* | 3/2011 | Kiyohara | H04L 41/0893 709/204 |
| 2011/0288912 A1* | 11/2011 | McCrea | G06Q 30/02 705/14.2 |
| 2012/0057456 A1* | 3/2012 | Bogatin | H04W 28/08 370/230.1 |
| 2013/0007186 A1* | 1/2013 | Liu | H04L 67/1008 709/213 |
| 2013/0110978 A1* | 5/2013 | Gordon | H04N 21/2665 709/218 |
| 2014/0068665 A1* | 3/2014 | Evans | H04N 21/4781 725/37 |
| 2014/0280689 A1* | 9/2014 | Rubenstein | G06F 16/172 709/214 |
| 2015/0039784 A1* | 2/2015 | Westphal | H04L 45/306 709/240 |
| 2015/0256571 A1* | 9/2015 | Ueno | H04L 65/403 709/204 |
| 2015/0296269 A1* | 10/2015 | Tokumo | H04N 21/238 725/93 |
| 2015/0319055 A1* | 11/2015 | Sakoda | H04L 67/16 709/224 |
| 2015/0350714 A1* | 12/2015 | Normile | H04N 21/433 725/32 |
| 2016/0006837 A1* | 1/2016 | Reynolds | H04W 84/18 709/203 |
| 2016/0050288 A1* | 2/2016 | Ueno | H04L 67/2842 709/218 |
| 2016/0081074 A1* | 3/2016 | Muramoto | H04L 47/29 370/392 |
| 2016/0294976 A1* | 10/2016 | Ueno | H04L 67/2842 |
| 2017/0019839 A1* | 1/2017 | Li | H04W 88/04 |
| 2017/0085441 A1* | 3/2017 | Azgin | H04L 43/028 |

FOREIGN PATENT DOCUMENTS

| | | |
|---|---|---|
| JP | 2012-244447 | 12/2012 |
| WO | WO2009-113371 | 2/2009 |

OTHER PUBLICATIONS

Hamilton, M., et al., "Cache Digest specification—version 5", squid-cache.org, Optimising Web Delivery, Dec. 1998, 6 pgs.

Wessels, D., et al., "Internet Cache Protocol (ICP), version 2", National Laboratory for Applied Network Research/UCSD, Sep. 1997, 9 pgs.

Yoshikazu Ichiki, "Cache Hit-rate Drop Avoidance Load Balancing in Web Proxy Network Systems", with machine translation, General Information Processing Society of Japan, dated Sep. 28, 2011, in 15 pages.

* cited by examiner

| CONTENT ID(ex.URL) | CONTENT SIZE | OFFLINE PLAYABILITY | APID |
|---|---|---|---|
| http://www.example.com/content/example1 | 100,000,000 | YES | AP1 |
| http://www.example.com/content/example2 | 1,000,000,000 | YES | AP1,AP2 |
| http://www.example.com/content/example3 | 10,000,000,000 | YES | AP2 |

FIG. 4

| PAGE ID(ex.URL) |
| --- |
| http://www.example.com/page/example1 |
| http://www.example.com/page/example2 |
| http://www.example.com/page/example3 |
| http://www.example.com/page/example4 |

| PAGE ID(ex.URL) | ESTIMATED DL TIME PERIOD | OFFLINE PLAYABILITY | APID |
|---|---|---|---|
| http://www.example.com/page/example1 | 1s | YES | AP1 |
| http://www.example.com/page/example2 | 10s | YES | AP1,AP2 |
| http://www.example.com/page/example3 | 100s | YES | AP2 |
| http://www.example.com/page/example4 | | | |

FIG. 7

| PAGE ID(ex.URL) | ESTIMATED DL TIME PERIOD | OFFLINE PLAYABILITY | FEE INFORMATION | APID |
|---|---|---|---|---|
| http://www.example.com/page/example1 | 1s | YES | 10 YEN | AP1 |
| http://www.example.com/page/example2 | 10s | YES | FREE | AP1,AP2 |
| http://www.example.com/page/example3 | 100s | YES | 50 YEN | AP2 |
| http://www.example.com/page/example4 | | | 100 YEN | |

FIG. 10

| PAGE ID(ex.URL) | ESTIMATED DL TIME PERIOD | OFFLINE PLAYABILITY | POINTS AWARDED | APID |
|---|---|---|---|---|
| http://www.example.com/page/example1 | 1s | YES | 5 | AP1 |
| http://www.example.com/page/example2 | 10s | YES | 10 | AP1,AP2 |
| http://www.example.com/page/example3 | 100s | YES | 1 | AP2 |
| http://www.example.com/page/example4 | | | | |

| CONTENT ID(ex.URL) | CONTENT SIZE | OFFLINE PLAYABILITY |
|---|---|---|
| http://www.example.com/content/example1 | 5,000,000 | YES |
| http://www.example.com/content/example2 | 10,000,000 | YES |
| http://www.example.com/content/example3 | 100,000,000 | YES |
| http://www.example.com/content/example4 | 200,000,000 | YES |

(b)

| CONTENT ID(ex.URL) | CONTENT SIZE | OFFLINE PLAYABILITY |
|---|---|---|
| http://www.example.com/content/example2 | 1,000,000 | YES |
| http://www.example.com/content/example5 | 10,000,000 | YES |
| http://www.example.com/content/example6 | 200,000,000 | YES |
| http://www.example.com/content/example7 | 400,000,000 | YES |

FIG. 13

| PAGE ID(ex.URL) |
|---|
| http://www.example.com/page/example1 |
| http://www.example.com/page/example2 |
| http://www.example.com/page/example3 |
| http://www.example.com/page/example4 |
| http://www.example.com/page/example5 |
| http://www.example.com/page/example6 |
| http://www.example.com/page/example7 |
| http://www.example.com/page/example8 |

| PAGE ID(ex.URL) | ESTIMATED DL TIME PERIOD | OFFLINE PLAYABILITY | APID |
|---|---|---|---|
| http://www.example.com/page/example1 | 1s | YES | AP1 |
| http://www.example.com/page/example2 | 1s | YES | AP1,AP2 |
| http://www.example.com/page/example3 | 20s | YES | AP1 |
| http://www.example.com/page/example4 | 20s | YES | AP1 |
| http://www.example.com/page/example5 | 1s | YES | AP2 |
| http://www.example.com/page/example6 | 40s | YES | AP2 |
| http://www.example.com/page/example7 | 40s | YES | AP2 |
| http://www.example.com/page/example8 | | | |

FIG. 19

COMMUNICATION DEVICE, COMMUNICATION METHOD, AND NON-TRANSITORY COMPUTER READABLE MEDIUM FOR CONTENT CACHE FUNCTION

CROSS-REFERENCE TO RELATED APPLICATIONS

This application is based upon and claims the benefit of priority from Japanese Patent Application No. 2016-169972, filed on Aug. 31, 2016; the entire contents of which are incorporated herein by reference.

FIELD

Embodiments described herein relate to a communication device, a communication method, and a non-transitory computer readable medium.

BACKGROUND

When a plurality of access points are provided in a wireless Local Area Network (LAN), it is possible to reduce the amount of usage of upper-level communication channels and to realize an improvement in response time to respond to users, by installing a content cache function in each of the access points.

In such an environment where two or more cache-attached access points are positioned in the vicinity of one another, it is possible to efficiently use content by making cached content stored in each of the access points available to the other access point. In that situation, it is necessary to share, among the access points, information about the access points positioned nearby and information about the cached content stored in the access points positioned nearby. When Internet Cache Protocol (ICP) is used, because it is necessary to designate Uniform Resource Locators (URLs) of the content, a huge amount of checking cost is required.

Further, when a piece of content requested by a user has not been cached in an access point, the access point needs to acquire the piece of content from a server, which makes the user's wait longer. Even when the piece of content has been cached in the access point, if the data size of the piece of content is extremely large, it takes a long time to download the piece of content, which in turn makes the user's wait longer.

BRIEF DESCRIPTION OF THE DRAWINGS

FIG. 4 is a drawing illustrating an example of shared cache information according to the first embodiment;

FIG. 7 is a drawing illustrating an example of an additional-information-attached content list according to the first embodiment;

FIG. 10 is a drawing for explaining a first modification example;

FIG. 11 is a drawing for explaining a second modification example;

FIG. 13 is a drawing illustrating examples of cache information according to the second embodiment;

FIG. 19 is a drawing illustrating an additional-information-attached content list according to the second embodiment;

DETAILED DESCRIPTION

Figure 1:
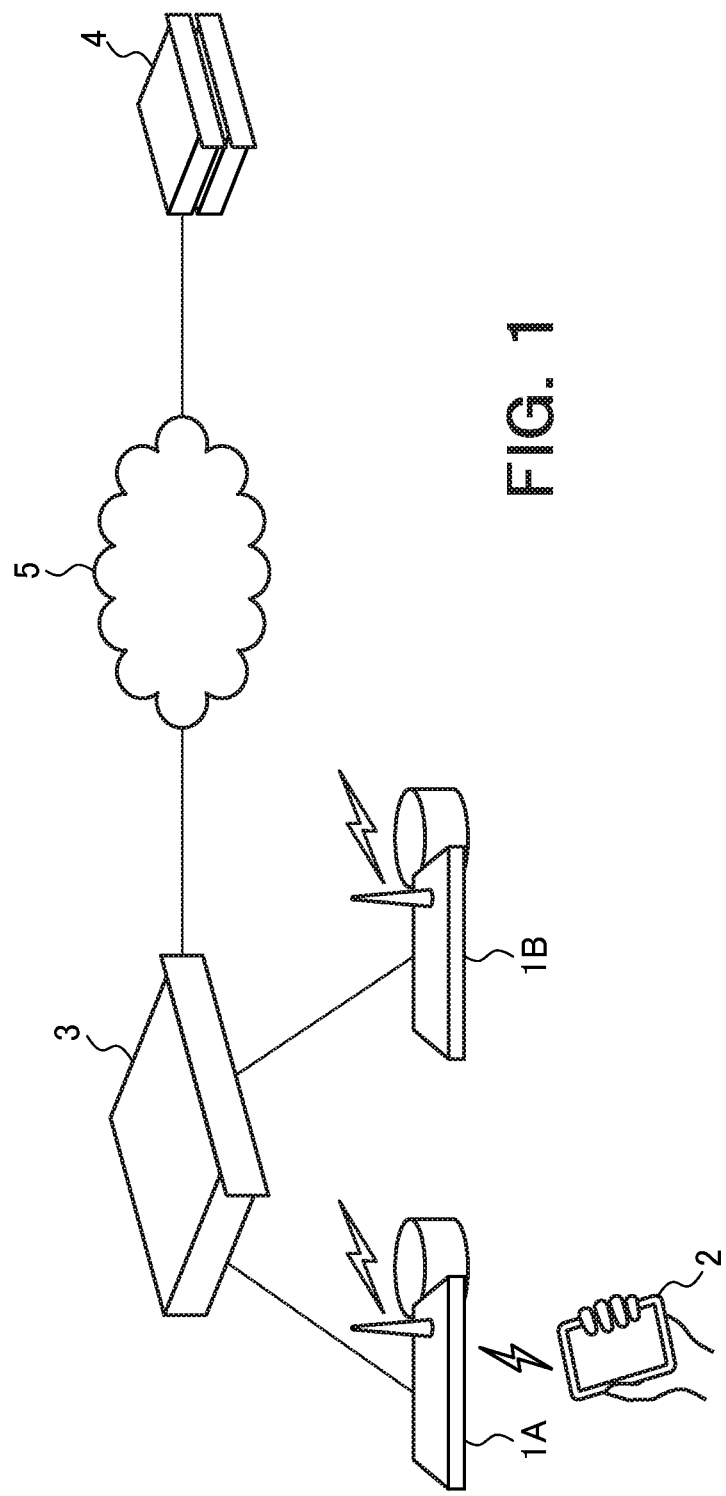
FIG. 1 is a drawing illustrating an example of a communication system according to a first embodiment.

According to one embodiment, a communication device includes: processing circuitry and communication circuitry.

The processing circuitry is configured to acquire first information related to one or more pieces of content cached in each of a plurality of relay devices that are capable of communicating with a server and are capable of exchanging any of the pieces of content cached therein with one another.

The processing circuitry is configured to acquire a first content list including an identifier of each of a plurality of pieces of content stored in the server.

The processing circuitry is configured to specify, on a basis of the first information, an identifier of a piece of content cached in at least one of the plurality of relay devices among the first content list and to generate a second content list including the specified identifier and second information indicating that the piece of content identified by the specified identifier is cached in at least one of the plurality of relay devices.

The communication circuitry is configured to transmit the second content list.

Exemplary embodiments of the present invention will be explained below, with reference to drawings. In the drawings, some of the constituent elements having the same name as each other will be referred to by using the same reference numerals, and the explanations thereof will be omitted as appropriate.

First Embodiment

FIG. 1 is a drawing illustrating an example of a communication system according to the present embodiment. The communication system in FIG. 1 includes a first access point 1A, a second access point 1B, a user terminal 2, a controller 3, and a server 4.

The first access point 1A and the second access point 1B are access points in a wireless Local Area Network (LAN). The access point 1A and the access point 1B are each a relay device configured to relay communication between a user terminal and the controller 3.

The user terminal 2 is a communication terminal capable of communicating wirelessly, such as a smartphone, a tablet terminal, or a feature phone, for example. In the example illustrated in the drawing, the user terminal 2 is wirelessly connected to the first access point 1A.

The controller 3 is a device configured to connect the first access point 1A and the second access point 1B to a network 5. The first access point 1A and the second access point 1B are connected to each other via the controller 3. Further, the first access point 1A and the second access point 1B are each connected to the network 5 via the controller 3. Another configuration from which the controller 3 is omitted is also possible. In that situation, the access point 1A and the access point 1B are each connected to another router or a switch device provided on an upper hierarchical level. In the present embodiment, the network 5 is the Internet; however, the network 5 may be a wide area network other than the Internet or may be a local area network.

The server 4 is a device present in the network 5 and is configured to provide various types of content and services. The server 4 is configured to receive a request from the user terminal 2, the first access point 1A, the second access point 1B, or the controller 3 and to provide data (e.g., a content list, a piece of content, or the like) corresponding to the request.

Figure 2:
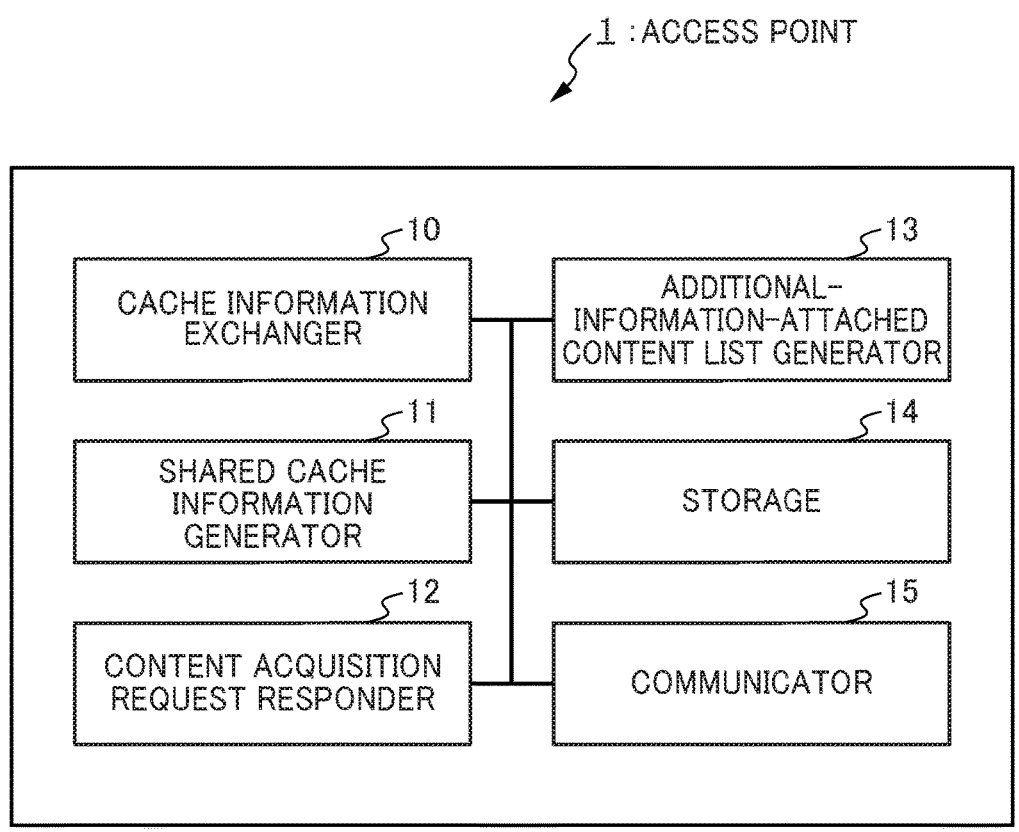
FIG. 2 is a block diagram illustrating a schematic configuration of an access point according to the first embodiment.

FIG. 2 is a functional block diagram of an access point in which a communication device of the present embodiment is installed. The access point may be either of the first and the second access points 1A and 1B illustrated in FIG. 1. Both the first access point 1A and the second access point 1B illustrated in FIG. 1 each have the functions of the blocks illustrated in FIG. 2. In the following explanations, the term "access point" denotes an arbitrary one of the first access point 1A and the second access point 1B. The drawing shows only some elements that are necessary for the explanation of the present embodiment and is not meant to exclude other elements.

As an alternative to the configuration of being installed in each of the access points 1A and 1B, the communication device of the present embodiment may also be configured to be installed in the controller 3 or the server 4. Further, the communication device of the present embodiment may be realized as an independent stand-alone device so as to be able to communicate with each of the access points, the controller 3, the server 4, or an arbitrary combination of these.

As illustrated in FIG. 2, the access point includes a cache information exchanger (a first acquirer) 10, a shared cache information generator 11, a content acquisition request responder (a second acquirer, a content provider) 12, an additional-information-attached content list generator (a content list generator) 13, a storage 14, and a communicator 15. The element 10, 11, 12 and 13 is configured by processing circuitry as one embodiment. The communicator 15 is configured by communication circuitry as one example. The access point is capable of communicating with another communication node such as the user terminal 2, the controller 3, or the other access point. When communicating with the other access point, the access point may communicate via the controller 3 or may communicate directly.

The cache information exchanger 10 is configured to acquire cache information of the other access point and to distribute cache information of the device of the own access point to the other access point. The cache information is information including an identifier, the content size, and an offline playability flag of each of the pieces of content cached in the storage 14 ("cached content"). The cache information corresponds to the first information related to cached content according to the present embodiment. Details of the cache information will be explained later.

The shared cache information generator 11 is configured to generate shared cache information on the basis of the pieces of cache information stored in the storages 14 of the own access point (i.e., the access point 1) and the other access point. The shared cache information is information integrating together the pieces of cache information of the access points. Details of the shared cache information will be explained later.

The content acquisition request responder 12 is configured to transmit a content list acquisition request to the server 4 and acquire the requested content list. The content list is a list showing one or more identifiers of one or more pieces of content stored in the server 4. The content list corresponds to the first content list according to the present embodiment. The content acquisition request responder 12 includes a second acquirer configured to acquire the first content list.

The additional-information-attached content list generator 13 is configured to generate an additional-information-attached content list, from the shared cache information and the content list acquired by the content acquisition request responder 12.

In the additional-information-attached content list, the identifier of a piece of content cached in at least one of the access points among the plurality of identifiers of the pieces of content included in the content list is set with additional information (the second information) indicating that the piece of content is cached in the one of the access points, or the like. It means that the pieces of content the identifiers of which are not set with the additional information have not been cached in any of the access points (i.e., the pieces of content are stored only in the server 4).

In other words, the additional-information-attached content list includes: the identifier of the piece of content that is among the content list and is cached in at least one of the access points; and the additional information (the second information) indicating that the piece of content is cached in said at least one of the access points, or the like. Further, the additional-information-attached content list includes: the identifiers of the pieces of content that are not cached in any of the access points (i.e., that are stored only in the server 4); and the information (the third information) indicating that these pieces of content are not cached in any of the access points. In the present embodiment, the third information is expressed by setting no value with the identifier. However, it is also acceptable to define a value explicitly indicating that a piece of content is not cached and to set the defined value as the identifier. Alternatively, the additional-information-attached content list may be configured so as to include neither the identifiers of the pieces of content that are not cached nor the third information. The additional-information-attached content list corresponds to the second content list according to the present embodiment. The additionalinformation-attached content list generator 13 includes a content list generator configured to generate the second content list.

The storage 14 is configured to store the cache information of the own access point and the cache information acquired from the other access point. Further, the storage 14 is configured to store (cache) therein one or more pieces of content. The content stored in the storage 14 may be referred to as cached content. To store a piece of content into the storage 14 may be expressed as "to cache a piece of content". A piece of content may be set up into the storage 14 in advance, may be acquired from the server 4 and cached into the storage 14, or may be acquired from the other access point and cached into the storage 14. In the present example, the cache information and the content are stored together in the storage 14; however, the cache information and the content may be stored in mutually-different storages. Further, the storage 14 may also store the shared cache information, the content list, and the additional-information-attached content list.

The communicator 15 is configured to transmit information or a request to another communication node and to receive information from another communication node. The term "another communication node" refers to the other access point, the server 4, the user terminal 2, or the controller 3, for example. In the following sections, transmissions and receptions to and from another communication node are assumed to be performed via the communicator 15, unless explicitly noted otherwise. Each of the access points may be connected to the other the access point 1, to the controller 3, and to the server 4, in a wireless manner or in a wired manner. Further, the communication interface provided on the controller 3 side and the communication interface provided on the user terminal 2 side may be different from each other.

In FIG. 2, the functional units (the blocks) are each configured as an independent element; however, another configuration is also acceptable in which two or more of the elements are put together to define a single functional unit.

Next, an operation related to exchanging the cache information and an operation related to providing the additional-information-attached content list will be explained.

First, it is assumed that a connection has been established between the first access point 1A and the second access point 1B, which is the other access point positioned in the surrounding of the first access point 1A. These access points are connected to each other via a wired or wireless network and have bidirectional communication established therebetween. The connection scheme and the communication scheme may each be of any type.

The cache information exchanger 10 included in the first access point 1A transmits a cache information acquisition request to the second access point 1B. In the present embodiment, the cache information is configured with a list containing one or more entries each including information about a content ID (an identifier of a piece of content) identifying a piece of cached content, a data size, and an offline playability flag.

Figure 3:
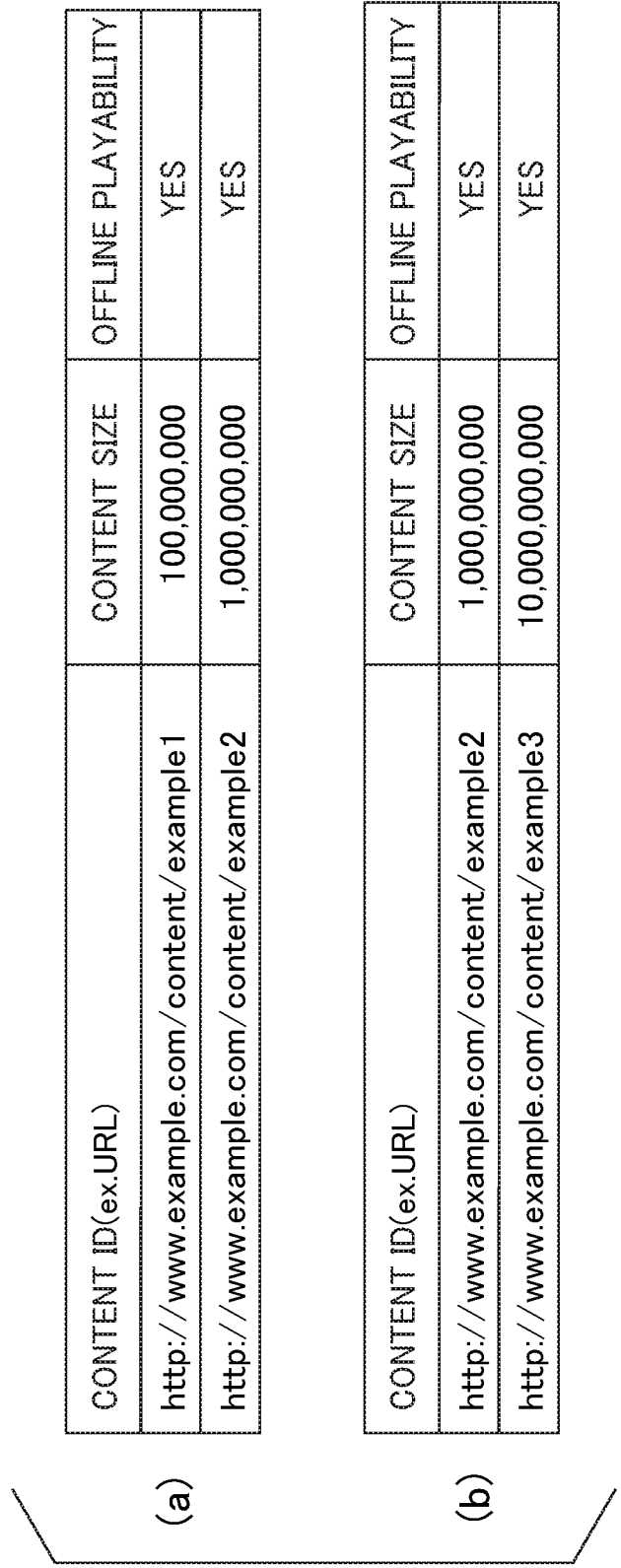
FIG. 3 is a drawing illustrating examples of cache information according to the first embodiment.

FIGS. 3(A) and 3(B) are drawings illustrating examples of the cache information. For example, FIG. 3(A) illustrates cache information of the first access point 1A in which URLs each serving as a content ID, the content sizes, and flags are in correspondence with one another, the flags each indicating whether or not it is possible to play back the corresponding piece of content under the condition of offline (hereinafter, "being playable offline"). In the present example, the first access point 1A has cached therein a piece of content named example 1 that has a size of 100,000,000 bytes and is playable offline and another piece of content named example 2 that has a size of 1,000,000,000 bytes and is playable offline. Similarly, FIG. 3(B) illustrates cache information of the second access point 1B. As illustrated in FIG. 3(B), the second access point 1B has cached therein the piece of content named example 2, similarly to the first access point 1A, and in addition, another piece of content named example 3 that has a size of 10,000,000,000 bytes and is playable offline.

In this situation, "being playable offline" means that it is possible to download the entirety of the corresponding piece of content and to locally play back the piece of content on a user terminal. The scheme by which a piece of content is played back while being downloaded at a predetermined rate from a network is called "streaming playback". In the present embodiment, it is assumed that pieces of content cached in an access point are playable offline. In contrast, it is assumed that other pieces of content, i.e., the pieces of content that are present only in the server 4, are playable only in streaming playback. It should be noted, however, that the pieces of content cached in an access point may also be distinguished as some pieces of content that are playable offline and other pieces of content that are playable in streaming playback (i.e., are not playable offline). In that situation, the pieces of content that are playable in streaming playback may each be set with an offline non-playability flag.

When having received a cache information acquisition request from the cache information exchanger 10 included in the first access point 1A, the cache information exchanger 10 included in the second access point 1B transmits the cache information of the second access point 1B to the first access point 1A, as a response. When having received the cache information of the second access point 1B, the first access point 1A stores and holds the cache information of the second access point 1B in the storage 14. Similarly, when the second access point 1B transmits a cache information acquisition request to the first access point 1A, the first access point 1A transmits the cache information stored therein to the second access point 1B. The second access point 1B stores and holds the cache information received from the first access point 1A in the storage 14. As a result of these operations, an exchange of the cache information between the access points is realized.

Each of the access points (1A and 1B) that have exchanged the cache information with each other generates the shared cache information from the pieces of cache information of the access point itself and the other access point and further stores and holds the generated shared cache information in the respective storages 14.

FIG. 4 is a drawing illustrating an example of the shared cache information. The shared cache information illustrated in FIG. 4 is obtained by putting together the pieces of cache information illustrated in FIGS. 3(A) and 3(B) into one piece of information and includes the pieces of cache information named example 1, example 2, and example 3. In addition, the shared cache information further includes APIDs that are the identifiers of the access points having the corresponding pieces of content (examples 1, 2, and 3) cached therein. Accordingly, the shared cache information has a plurality of entries each including a content ID, a content size, an offline playability flag, and one or more APIDs. For example, the content named example 2 in FIG. 4 is cached in both the access point 1A and the access point 1B. For example, a Service Set Identifier (SSID) may be used as each of the APIDs.

Figures 5, 6:
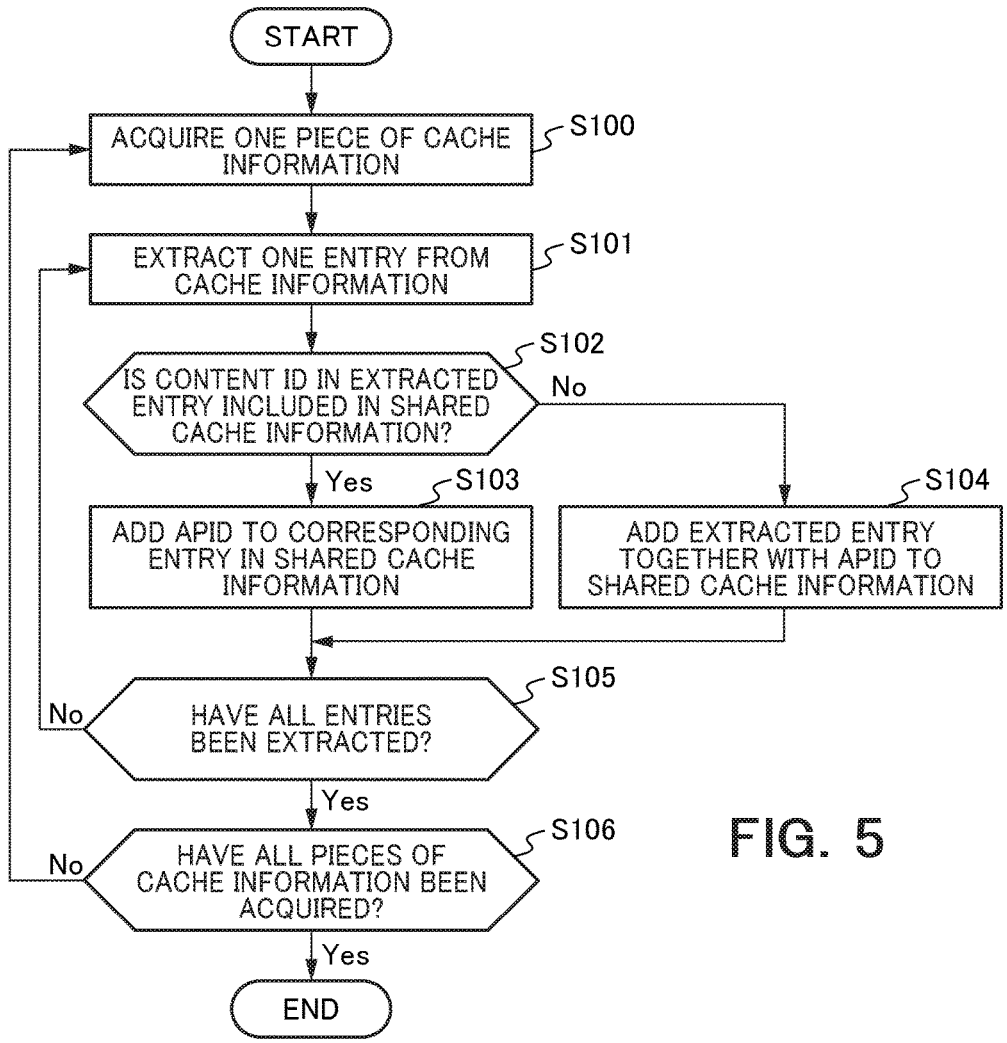
FIG. 5 is a flowchart of generating the shared cache information according to the first embodiment.
FIG. 6 is a drawing illustrating an example of a content list according to the first embodiment.

FIG. 5 is a flowchart illustrating an operation performed by the shared cache information generator 11 included in the access point 1, in relation to a process of generating the shared cache information.

First, the shared cache information generator 11 obtains one of the pieces of cache information stored in the storage 14 (step S100). For example, when the cache information illustrated in FIG. 3(A) and the cache information illustrated in FIG. 3(B) are stored in the storage 14, the shared cache information generator 11 acquires the cache information illustrated in FIG. 3(A).

After that, the shared cache information generator 11 extracts one entry from the cache information (step S101). For example, the shared cache information generator 11 extracts the entry including the content ID "http://example.com/content/example1", the content size 100,000,000, and the offline playability flag indicating "YES" (playable offline).

Subsequently, the shared cache information generator 11 judges whether or not the content ID in the extracted entry is included in the shared cache information (step S102). When the shared cache information has an entry including the content ID (step S102: Yes), the shared cache information generator 11 adds, to the entry, the APID of the access point having cached therein the content identified by the content ID (step S103). In this situation, when the entry already includes the same APID, it is not necessary to add the APID thereto.

In contrast, when the shared cache information has no entry including the content ID (step S102: No), the shared cache information generator 11 adds a new entry to the shared cache information. In other words, the shared cache information generator 11 adds an entry including the content ID, the content size, the offline playability flag, and the APID of the access point having the content cached therein (step S104). For example, it is supposed that the entry of example 2 is extracted from the cache information of the first access point 1A illustrated in FIG. 3(A). When the entry of example 2 is already present in the shared cache information, but only "AP2" has been written as the APID, the shared cache information generator 11 adds "AP1" to the entry.

After that, the shared cache information generator 11 judges whether or not all the entries in the cache information have been extracted (step S105). When not all the entries have been extracted (step S105: No), the shared cache information generator 11 extracts the next entry from the cache information and performs the processes at steps S102 through S104. In contrast, when all the entries have been extracted (step S105: Yes), the shared cache information generator 11 judges whether or not all the pieces of cache information have been acquired (step S106).

For example, in a situation where it is possible to refer to the pieces of cache information illustrated in FIGS. 3(A) and 3(B), when all the entries in the piece of cache information illustrated in FIG. 3(A) have been extracted, but the piece of cache information illustrated in FIG. 3(B) has not been acquired (step S106: No), the shared cache information generator 11 acquires the piece of cache information illustrated in FIG. 3(B) as a new piece of cache information and continues to perform the process (steps S101 through S105). In contrast, when all the pieces of cache information have been acquired (step S106: Yes), the shared cache information generation process is ended.

In the description above, the example is explained in which there are two access points; however, even when there are three or more access points, each of the access point is able to generate shared cache information reflecting pieces of cache information of the three or more access points as a result of each of the access points exchanging the cache information with the other access points. Further, when transmitting the cache information, each of the access points may be configured so as to transmit one or more pieces of cache information of one or more other access points that have already been acquired, together with the cache information of the own access point.

As another example, each of the access points may be configured to exchange the cache information by broadcasting the cache information to the other access points. As for the timing of the broadcasting, the cache information may be broadcasted when another access point is newly added, may be broadcasted periodically, or may be broadcasted when a change is made to the cache information. Further, the cache information may be exchanged by using this method combined with the method described above.

Next, a process of providing the additional-information-attached content list will be explained. It is assumed that a connection has been established between the user terminal 2 and the first access point 1A, that the cache information has been exchanged between the first access point 1A and the second access point 1B, and that the shared cache information is stored in each of the storages 14 of the access points 1A and 2B. It is also assumed that an empty band that is usable by the user terminal 2 is set in advance between the first access point 1A and the user terminal 2.

When having received an additional-information-attached content list acquisition request from the user terminal 2, the second acquirer of the content acquisition request responder 12 included in the first access point 1A transmits a content list acquisition request to the server 4. An example of the content list is illustrated in FIG. 6. The content list is structured with one or more entries. Each of the entries includes a page ID identifying the page of the content, which may be a URL, for example.

When having received the content list acquisition request from the first access point 1A, the server 4 transmits the content list to the first access point 1A in response to the request. The content list may be, for example, a list of pieces of content recommended to the user. When having received the content list, the content acquisition request responder 12 included in the first access point 1A forwards the received content list to the additional-information-attached content list generator 13. When transmitting the content list acquisition request, the first access point 1A may transmit identification information of the user (a user ID or the like) to the server 4. The server 4 may generate the content list in accordance with the user ID.

When having received the content list from the content acquisition request responder 12, the additional-information-attached content list generator 13 reads the shared cache information from the storage 14 and generates an additional-information-attached content list from the content list and the shared cache information. In the following sections, an example of a method for generating the additional-information-attached content list will be explained with reference to FIGS. 7 and 8.

FIG. 7 is a drawing illustrating an example of the additional-information-attached content list. As illustrated in FIG. 7, the additional-information-attached content list contains, with respect to each of the pieces of cached content, an entry including a page ID, an estimated download time period (an estimated DL time period) of the piece of content, an offline playability flag, and one or more APIDs. The additional-information-attached content list contains, with respect to each of the pieces of content other than the pieces of cached content, an entry including only the page ID. As for the APID of the AP to which the user terminal belongs, the APID may be displayed in such a manner (e.g., displayed in a different color) that the viewer is able to recognize the belonging relationship. The estimated DL time period, the offline playability flag, and the APIDs are each an example of the second information according to the present embodiment. It is understood that a piece of content identified by a content ID set with the second information is a piece of content cached in at least one of the access points.

The estimated download time period indicates an estimated time period required to download the piece of cached content identified by the content ID from the access point to which the user terminal 2 is connected. Accordingly, even with the same piece of content, there is a possibility that the estimated time period may vary in the additional-information-attached content list depending on the access point to which the user terminal 2 is connected. When the piece of cached content is present in the other access point different from the access point to which the user terminal 2 is connected, the estimated time period includes the time period the connected access point receiving the piece of content from the other access point and the time period the connected access point transmitting the piece of content to the user terminal 2. When there are two or more such access points, the shortest time period may be used or a statistical value such as an average of the time periods among the access points may be used.

As explained later, by referring to the estimated time periods, the user of the terminal 2 is able to predict the time period required to download each of the pieces of content. For example, when the user is staying in a Wi-Fi spot, the user is able to determine whether or not the download of a piece of content should be executed or not, depending on how long is the remaining time the user is planning to stay in the Wi-Fi spot.

Figure 8:
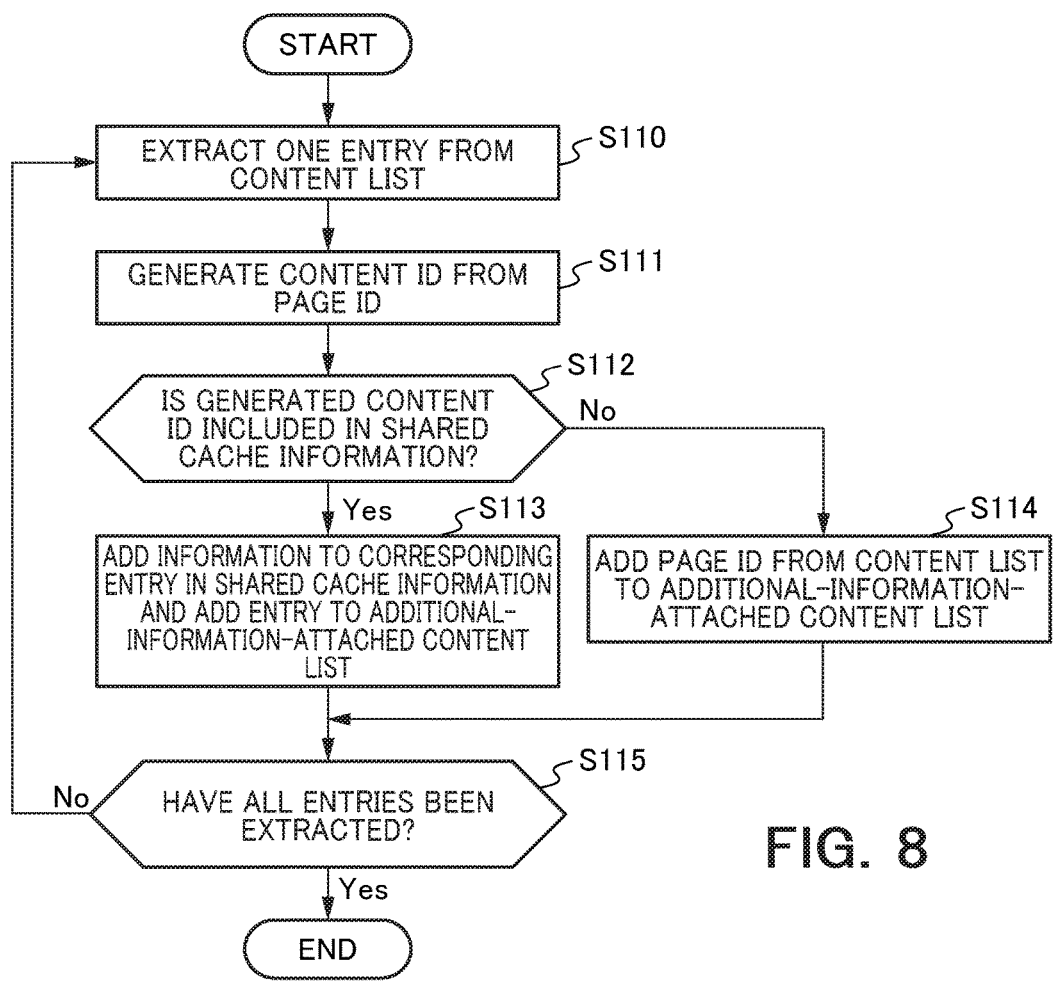
FIG. 8 is a flowchart of generating the additional-information-attached content list according to the first embodiment.

FIG. 8 is a flowchart illustrating a process performed by the additional-information-attached content list generator 13 to generate the additional-information-attached content list. First, the additional-information-attached content list generator 13 extracts one entry from the content list (see FIG. 6) received from the server 4 (step S110). For example, from the content list illustrated in FIG. 6, the additional-information-attached content list generator 13 extracts the entry having the page ID "http://example.com/page/example1".

After that, the additional-information-attached content list generator 13 generates a content ID from the page ID (step S111). In the present embodiment, the additional-information-attached content list generator 13 generates the content ID by replacing the word "page" included in the page ID with the word "content". However, possible methods for generating the content ID are not limited to this example. A value that is the same as the page ID may be used as the content ID. As long as it is possible to keep the page ID and the content ID in one-to-one correspondence with each other, it is acceptable to generate the content ID by using any conversion method.

Subsequently, the additional-information-attached content list generator 13 compares the generated content ID with the content IDs in the entries of the shared cache information and judges whether the generated content ID is included in the shared cache information (step S112). When at least one entry having the same content ID as the generated content ID is included in the shared cache information (step S112: Yes), the additional-information-attached content list generator 13 sets additional information corresponding to the entry with the page ID corresponding to the content ID (i.e., the page ID from which the content ID was generated) and further adds the entry including the page ID and the additional information to the additional-information-attached content list (step S113). The additional information corresponds to the second information according to the present embodiment.

More specifically, the additional information (the second information) may be the estimated download time period calculated on the basis of the data size of the content, the offline playability flag, the one or more APIDs, and the like. For example, the additional-information-attached content list generator 13 adds an entry including the content ID, the estimated download time period (the estimate DL time period), the offline playability flag, and the one or more APIDs described above, to the additional-information-attached content list. For example, the estimated download time period is calculated by using a value obtained by dividing the data size by a transfer rate of the band. An entry including the additional information is an entry corresponding to a piece of content cached in at least one of the access points.

In contrast, when the shared cache information does not include the same content ID as the generated content ID (step S112: No), the additional-information-attached content list generator 13 adds an entry including only the page ID with respect to the piece of content identified by the content ID, to the additional-information-attached content list (step S114). For example, as in the entry illustrated in the lowest row of FIG. 7, the page ID "http://example.com/page/example4" is added to the additional-information-attached content list. This entry does not include any additional information (the second information) such as an estimated download time period, an offline playability flag, or an APID. However, it should be noted that another arrangement is also acceptable in which information such as an estimated download time period and an offline non-playability flag (or an offline playability flag if the content is playable offline) is added to the list, also with respect to a piece of content corresponding to such an entry (i.e., a piece of content that is present only in the server 4).

Subsequently, the additional-information-attached content list generator 13 judges whether or not all the entries included in the content list have been extracted (step S115). When all the entries included in the content list have been extracted (step S115: Yes), the process of generating the additional-information-attached content list is ended. In contrast, when not all the entries included in the content list have been extracted (step S115: No), the next entry is extracted and the process described above is repeatedly performed (steps S110 through S114).

When the process of generating the additional-information-attached content list is completed, the additional-information-attached content list generator 13 transmits the additional-information-attached content list to the user terminal 2, as a response. When having received the additional-information-attached content list, the user terminal 2 displays the received additional-information-attached content list on its screen. By referring to the additional-information-attached content list displayed on the screen, with respect to each of the pieces of content, the user is able to judge whether or not it is possible to play back the piece of content offline (whether or not the piece of content has been cached), to predict the time period required to download the piece of content, and the like.

Next, an operation to provide a piece of content will be explained. When having received a content acquisition request including a page ID from the user terminal 2, the content provider of the content acquisition request responder 12 included in the first access point 1A checks for the cache status of the piece of content having the content ID corresponding to the page ID and further acquires the piece of content from one selected from among the storage 14, the other access point, and the server 4, depending on the result indicating the cache status, so as to transmit the acquired piece of content to the user terminal 2. In this manner, the content provider responds to the acquisition request from the user terminal 2.

Figure 9:
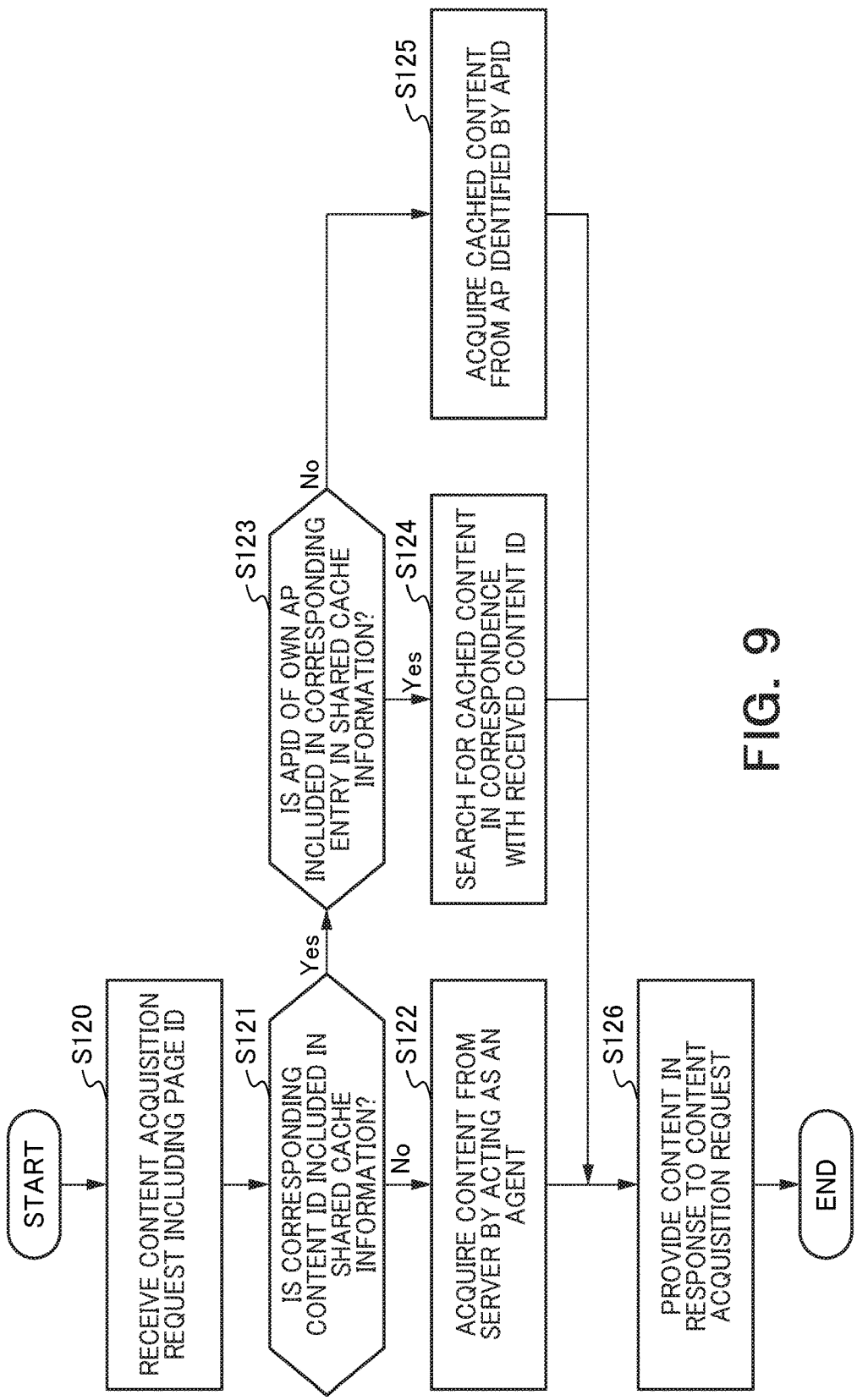
FIG. 9 is a flowchart of a cached content response according to the first embodiment.

FIG. 9 is a flowchart illustrating a process in the operation to provide the content. First, the first access point 1A receives a content acquisition request including a page ID, from the user terminal 2 (step S120).

After that, the content acquisition request responder 12 reads the shared cache information stored in the storage 14 and further judges whether or not the content ID is included in the shared cache information by comparing the content ID corresponding to the page ID requested in the content acquisition request with the shared cache information (step S121).

When the content ID requested in the acquisition request is not included in the shared cache information (step S121: No), the content acquisition request responder 12 performs an acquisition request on the basis of the page ID to the server 4 that serves as a distribution source of the content and further acquires the content from the server 4 (step S122). In that situation, the acquired content may be cached into the storage 14, and the cache information may be updated.

In contrast, when the content ID requested in the acquisition request is included in the shared cache information (step S121: Yes), the content acquisition request responder 12 extracts the entry including the content ID from the shared cache information and further judges whether or not the extracted entry includes the APID of the own access point (step S123). In other words, the content acquisition request responder 12 judges whether or not the APID "AP1" of the first access point 1A is included under the item "APID" of the extracted entry.

When the APID of the own access point is included under the item "APID" of the extracted entry (step S123: Yes), the content acquisition request responder 12 searches the storage 14 of the own access point for the piece of content associated with the content ID requested in the acquisition request (step S124).

In contrast, when the APID of the own access point is not included under the item "APID" of the extracted entry (step S123: No), the content acquisition request responder 12 reads one of the APIDs included under the item APID. After that, the content acquisition request responder 12 transmits a cached content acquisition request to the access point identified by the read APID and acquires the piece of cached content from the access point (step S125). In that situation, when two or more APIDs are included under the item "APID" of the extracted entry, one of the APIDs that requires the shortest time period to acquire the piece of content may be selected. Alternatively, the APID of such an access point that will use bands in upper-level communication channels as little as possible may be selected. In another example, the acquired piece of content may be cached (stored) into the storage 14 of the own access point, so that the cache information is updated. Another arrangement is also acceptable in which a piece of content is cached after an acquisition request for the piece of content has been received a certain number of times.

When the preparation for providing the piece of content has been finished, the content acquisition request responder 12 transmits the piece of content to the user terminal 2 as a response to the content acquisition request (step S126).

As explained above, when having received the content acquisition request from the user terminal 2, the first access point 1A provides the piece of cached content, when the piece of content is cached in either the access point itself or any of the other access points. In contrast, the first access point 1A acquires the piece of content from the server 4, when the piece of content is not cached in any of the access points and provides the user terminal 2 with the acquired piece of content.

As explained above, according to the present embodiment, as being provided with the additional-information-attached content list, the user is able to distinguish the pieces of cached content from the pieces of uncached content and is also able to judge whether or not the content is playable offline (downloadable) and to determine the estimated time period required to download the content. In consideration of these pieces of information, the user is able to determine whether or not the download should be executed and which piece of content is to be downloaded. For example, when there is a piece of content of which the estimated time period required for the downloading is short, the user is able to plan that he/she will leave the Wi-Fi spot after downloading the piece of content. When there is no piece of content of which the estimated download time period is within a tolerated length of time, the user is able to determine that he/she should leave the Wi-Fi spot without performing any download.

Further, according to the present embodiment, because the information (the cache information) related to the cached content is shared in advance between the access points, it is possible to reduce the cost caused by checking to see whether or not a piece of cached content requested by a user has been cached in the other access point. With this arrangement, it is possible to provide the user with the content at a high speed, while securing the bands in the upper-level communication channels between the server 4 and the access points.

Further, it is also acceptable even when there are two or more bitrate versions with respect to a single piece of content. In that situation, with respect to each of the versions of the same piece of content having the mutually-different bitrates, an entry is generated so as to include one of mutually-different content IDs and one of mutually-different content sizes, so that the generated entries are added to the cache information. Accordingly, the additional-information-attached content list has added thereto entries including mutually-different estimated download time periods in correspondence with the different versions of the same piece of content having the mutually-different bitrates. With this arrangement, by referring to the additional-information-attached content list, the user is able to determine, even for the different versions of the same piece of content, the quality of the content to be downloaded, in consideration of the estimated time period required to download. (For the same piece of content, it is considered that the quality is higher, when the estimated time period required to download is longer.)

Further, the shared cache information does not necessarily have to reflect the cache information of the other access point. What is stored in the shared cache information may be based only on the cache information of the access point storing the information. In that situation, because only the APID of the storing access point is included under the item "APID" of the shared cache information, the item "APID" may be deleted.

Next, the following describes a process performed by an access point when a change has occurred in the cache information, e.g., a process performed when the cache information has been updated for the reason that a new piece of cached content has been added or that an old piece of cached content has been deleted. In that situation, the access point transmits the updated cache information to access points positioned in the surrounding of the own access point by a broadcast transmission. In another example, the access point may transmit the most up-to-date cache information by a broadcast transmission once every predetermined period of time, instead of transmitting the cache information at the times when the cache information is updated.

Instead of transmitting the cache information with the timing described above, the access point may transmit the cache information at the time when a content acquisition request is made by the user terminal 2. In another example, the access point may transmit the cache information at the time when a cache information acquisition request is made by the other access point.

First Modification Example

Content fee information may be added to the additional-information-attached content list. An example of the additional-information-attached content list including the fee information is illustrated in FIG. 10. Fee information is added for each of the pieces of content. For example, the price of the piece of content listed in the first row is 10 yen, whereas the piece of content listed in the second row is free of charge.

When generating the cache information and the shared cache information, each of the access points arranges the content fee information to be included in the cache information and the shared cache information. When providing the content list, the server 4 arranges the content fee information to be included in the content list. With respect to the same piece of content, each of the access points may set a fee that is different from the fee for the server 4, e.g., a price that is lower (which may be free of charge) than the price for the server 4. When generating the additional-information-attached content list, each of the access points adopts the fee information for the access point itself instead of the fee information in the content list provided by the server 4, with respect to each of the pieces of cached content. In contrast, the access point adopts the fee information in the content list, with respect to each of the pieces of content that have not been cached in any access point. The content fee information may be varied among the plurality of access points. In that situation, when the shared cache information and the additional-information-attached content list are generated, separate entries may be provided for the mutually-different access points, even with respect to the same piece of content.

It is also acceptable to provide a fee charge system capable of communicating with each of the access points and with the server 4 so that the fee charge system is configured to acquire information about users and information about pieces of content provided for the users from the access points and to perform a process of charging the fees on the users. The fee charge system may manage the prices of the pieces of content cached in each of the access points.

Further, the fee charge system may be installed in at least one of the access points or in the server 4.

Second Modification Example

The additional-information-attached content list may have added thereto information about points to be awarded in accordance with the providing of the content. An example of the additional-information-attached content list including the point information is illustrated in FIG. 11. The point information is added for each of the pieces of content. For example, the points for the piece of content listed in the first row are five points. When the piece of content is provided for a user terminal, five points are awarded to the user. When a piece of content is downloaded from the server 4, no point is awarded. However, another configuration is also acceptable in which points are also awarded for a piece of content downloaded from the server 4.

When generating the cache information and the shared cache information, each of the access points arranges the content point information to be included in the cache information and the shared cache information. Further, when generating the additional-information-attached content list, each of the access points arranges the content point information to be included in the additional-information-attached content list. The content point information may be varied among the plurality of access points. In that situation, when the shared cache information and the additional-information-attached content list are generated, separate entries may be provided for the mutually-different access points, even with respect to the same piece of content.

It is also acceptable to provide a point management system capable of communicating with each of the access points so that the point management system is configured to manage the points for each of the users. The point management system may be installed in at least one of the access points. The point management system is configured to acquire information about users (user IDs or the like) and information about pieces of content provided for the users from the access points and to award points to the users in accordance with the pieces of content provided for the users. Each of the users may be provided with a specific service or a specific commercial product in accordance with accumulated points. For example, the users may be provided with a specific piece of bonus content in accordance with the accumulated points. In another example, when a piece of content is provided for a fee, the user may pay a part or the entirety of the fee for the piece of content by using the points. In that situation, it is also acceptable to combine the second modification example with the first modification example so that the price of each of the pieces of content is managed.

Second Embodiment

In the present embodiment, a set made up of content IDs of pieces of cached content is represented as a bit vector in a Bloom filter, so that exchanging the Bloom filters makes it possible to reduce the sizes of the stored information and the information exchanged among the access points and to increase the speed of the process of judging whether or not a piece of content has been cached. In the following sections, the present embodiment will be explained in detail, while a focus is placed on the differences from the first embodiment described above.

Figure 12:
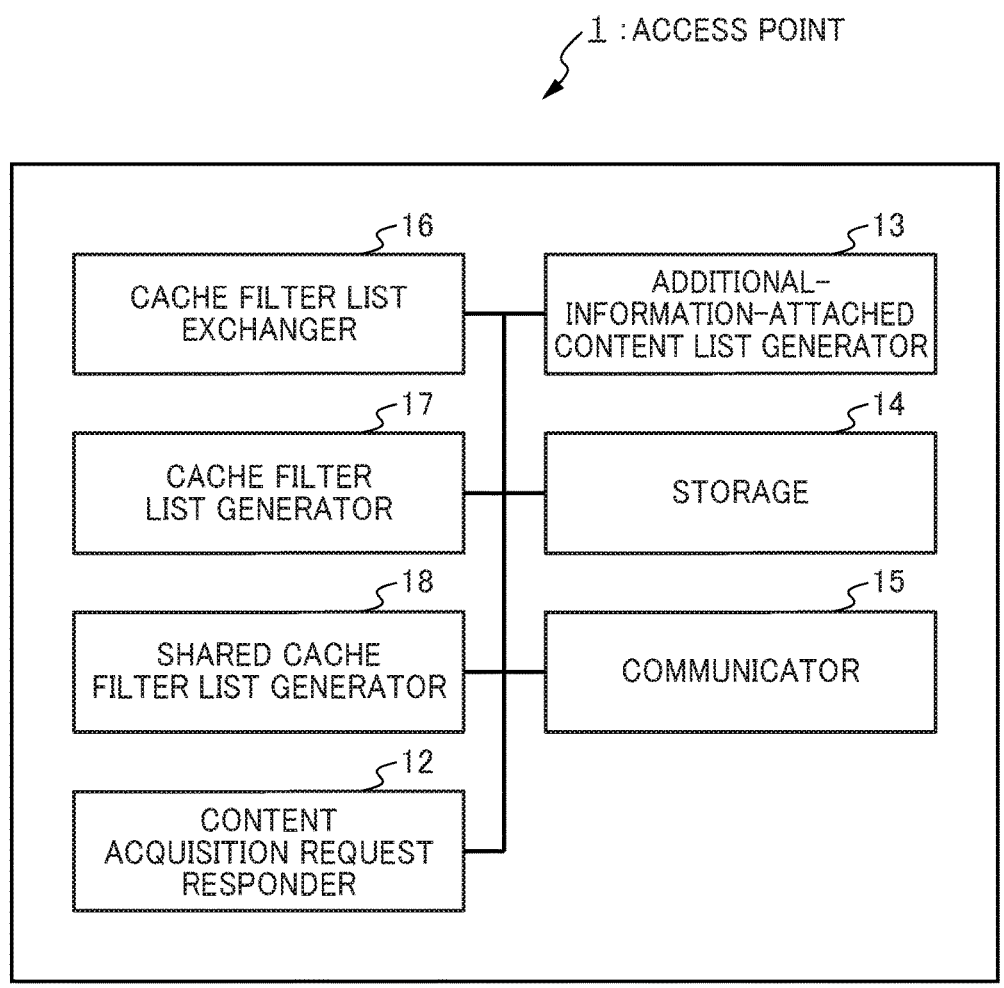
FIG. 12 is a block diagram illustrating a schematic configuration of an access point according to a second embodiment.

FIG. 12 is a functional block diagram illustrating an example of an access point in which a communication device according to the present embodiment is installed. The drawing shows only some elements that are necessary for the explanation of the present embodiment and is not meant to exclude other elements.

The access point illustrated in FIG. 12 includes a cache filter list exchanger (the first acquirer) 16, a cache filter list generator 17, a shared cache filter list generator 18, a content acquisition request responder (the second acquirer, the content provider) 12, the additional-information-attached content list generator 13, the storage 14, and the communicator 15. The access point illustrated in FIG. 12 is different from the access point according to the first embodiment illustrated in FIG. 2 for including the cache filter list exchanger 16, the cache filter list generator 17, and the shared cache filter list generator 18, in place of the cache information exchanger 10 and the shared cache information generator 11. In FIG. 12, the functional units described above are each configured as an independent element; however, possible configurations are not limited to this example. Another configuration is also acceptable in which two or more of the elements are put together to define a single functional unit.

The cache filter list generator 17 is configured to generate a cache filter realized with a Bloom filter, for each of various content size ranges, on the basis of the cache information of the own access point. The cache filter list generator 17 generates entries in each of which a different one of the cache filters is associated with information about a corresponding content size range or the like and further generates a cache filter list that lists the generated entries. The cache filter list and the cache filter each correspond to an example of the first information according to the present embodiment.

The cache filter list exchanger 16 is configured to acquire the cache filter list of the other access point and to transmit the cache filter list of the own access point to the other access point.

The shared cache filter list generator 18 is configured to generate a shared cache filter list on the basis of the cache filter lists of the own access point and the other access point.

Details of the Bloom filters, the cache filter lists, and the shared cache filter list will be explained later.

FIGS. 13(A) and 13(B) are drawings illustrating examples of the cache information according to the present embodiment. For example, FIG. 13(A) illustrates cache information stored in the first access point 1A. FIG. 13(B) illustrates cache information stored in the second access point 1B. Because the explanation of the cache information is similar to that in the first embodiment, detailed explanation thereof will be omitted.

Figure 14:
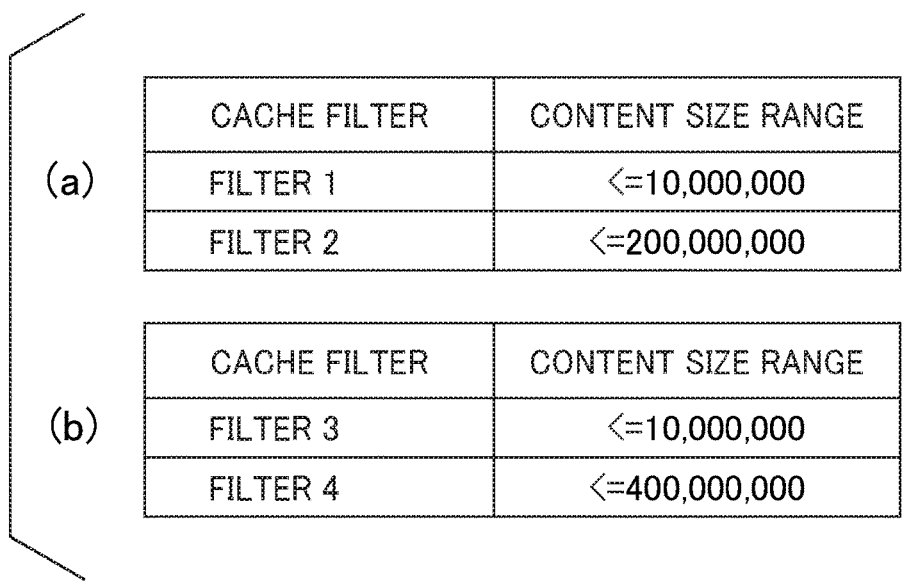
FIG. 14 is a drawing illustrating an example of a cache filter list according to the second embodiment.

FIGS. 14(A) and 14(B) are drawings illustrating examples of the cache filter lists. Each of the entries in the cache filter lists includes information about a cache filter and a content size range. FIG. 14(A) illustrates a cache filter list of the first access point 1A that has been generated from the cache information illustrated in FIG. 13(A). FIG. 14(B) illustrates a cache filter list of the second access point 1B that has been generated from the cache information illustrated in FIG. 13(B).

Each of the cache filters is a Bloom filter generated by using a Bloom filter algorithm. Each of the Bloom filters has a certain bit length and, as an initial value of each Bloom filter, all the bits are "0". Each of the Bloom filters has registered therein one or more content IDs of one or more pieces of content each having a size included in the corresponding content size range. The registration process is performed by converting the content ID of each piece of content into one or more hash values while using one or more hash functions, so that one or more bits corresponding to the one or more hash values are changed to "1" (When any of the bits is already "1", the bit is maintained to be "1"). In this manner, the content IDs are registered into the cache filters. In the manner described above, each of the cache filters is prepared for a different one of the content size ranges, so that each of the cache filters includes a bit vector indicating the content IDs of the pieces of content belonging to the corresponding content size range.

For example, in the cache filter list illustrated in FIG. 14(A), Filter 1 is a Bloom filter having registered therein the content IDs of pieces of content (the two content IDs at the top of the cache information illustrated in FIG. 13(A)) of which the content size is equal to or smaller than 10,000,000 bytes. Similarly, Filter 2 is a Bloom filter having registered therein the content IDs of pieces of content (the two content IDs at the bottom of the cache information illustrated in FIG. 13(A)) of which the content size is larger than 10,000,000 bytes and is equal to or smaller than 200,000,000 bytes. In other words, the cache filters in FIG. 14(A) are obtained by classifying the cache information illustrated in FIG. 13(A) according to the content size ranges and compressing the plurality of content IDs with the use of the Bloom filters in correspondence with sections resulting from the classification.

Figures 15, 16:
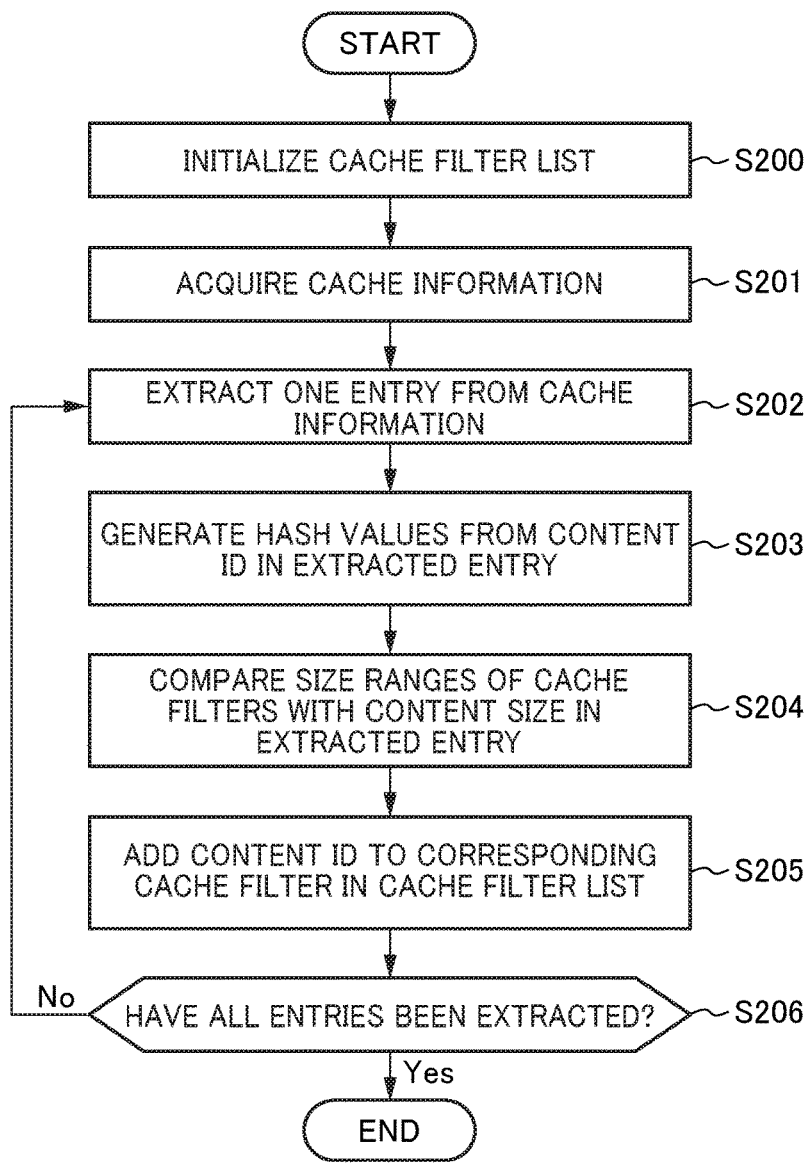
FIG. 15 is a flowchart of generating a cache Biter according to the second embodiment.
FIG. 16 is a drawing illustrating an example of a shared cache filter list according to the second embodiment.

FIG. 15 is a flowchart illustrating an operation performed by an access point in the process of generating the cache filter list from the cache information. The process illustrated in FIG. 15 is performed by the cache filter list generator 17 in each of the access points, unless noted otherwise. In the present example, a situation will be discussed in which, for example, the cache filter list is generated when a cache filter list acquisition request is received from the other access point. The following sections will explain a situation in which the cache filter list exchanger 16 included in the first access point 1A has made a cache filter list acquisition request to the cache filter list exchanger 16 included in the second access point 1B. When two or more access points make acquisition requests within a predetermined time period, a cache filter list that has already been generated may be re-used.

First, the cache filter list generator 17 included in the second access point 1B initializes the cache filter list of the second access point 1B (step S200). For example, the initialization is performed by changing all the bits in each of the cache filters (the Bloom filters) within the cache filter list to "0".

Next, the cache filter list generator 17 acquires the cache information of the second access point 1B from the storage 14 (step S201). Further, the cache filter list generator 17 extracts one entry from the acquired cache information (step S202).

Subsequently, the cache filter list generator 17 calculates one or more hash values, by calculating one or more hash functions while using the content ID in the extracted entry as an argument (step S203). In this situation, the hash functions may be those generally used or those originally derived. Examples of the hash functions include MD5, SHA-1, SHA-2, and SHA-3, but are not limited to these. It is desirable to calculate the hash values so that there is as little conflict as possible. In consideration of capabilities of the access points and the speeds at which the hash values are calculated, the one or more hash functions to be used may be selected. It is assumed that the one or more functions being used are the same among the access points.

Subsequently, by comparing the content size ranges of the cache filters with the content size in the extracted entry, the cache filter list generator 17 specifies the cache filter corresponding to the content size range to which the content size belongs (step S204).

After that, the cache filter list generator 17 registers the content ID in the extracted entry into the specified cache filter (step S205). More specifically, the cache filter list generator 17 calculates one or more hash values from the content ID by using one or more hash functions and further changes the bits corresponding to the calculated one or more hash values to "1", in the bit sequence in the specified cache filter.

Subsequently, the cache filter list generator 17 judges whether all the entries have been extracted from the cache information (step S206). When all the entries have been extracted (step S206: Yes), the process of generating the cache filter list is ended. In contrast, when not all the entries have been extracted (step S206: No), the cache filter list generator 17 registers each of the content IDs in all the entries into a corresponding cache filter by repeatedly performing the processes at steps S202 through S205.

The cache filter list exchanger 16 included in the second access point 1B transmits the cache filter list generated in the manner described above to the first access point 1A. Further, in that situation, the cache filter list generator 17 included in the first access point 1A may similarly generate a cache filter list of the first access point 1A and transmit the cache filter list of the first access point 1A to the cache filter list exchanger 16 included in the second access point 1B. As a result of these operations, the cache filter lists have been exchanged between the access point 1A and the access point 1B. The cache filter list received at each of the access points is stored and held in the storages 14 of the respective access points. Further, in that situation, an APID indicating the access point to which each of the cache filter lists corresponds is also stored in correspondence with the cache filter list.

After the cache filter lists have been exchanged, the shared cache filter list generator 18 included in each of the access points is configured to generate a shared cache filter list on the basis of the cache filter list generated in the own access point and the received cache filter list generated in the other access point. The generated shared cache filter lists are stored and held in the storages 14 of the access points.

FIG. 16 is a drawing illustrating an example of the shared cache filter list. For example, as illustrated in FIG. 16, each of the entries in the shared cache filter list includes an APID and information about cache filters and content size ranges. The APID indicates the access point to which each of the cache filters corresponds. In other words, the APID is an identifier identifying the access point that has cached therein the pieces of content identified by the content IDs registered in the cache filter. Each of the cache filters is a cache filter (a Bloom filter) generated by the cache filter list generator 17 included in the corresponding access point, as described above.

For example, Filter 1 is a Bloom filter having registered therein the content IDs of the pieces of content of which the content size is equal to or smaller than 10,000,000 bytes, among the pieces of cached content stored in the first access point 1A. Filter 4 is a filter having stored therein one or more content IDs of one or more pieces of content of which the content size is equal to or smaller than 400,000,000 bytes, among the pieces of cached content stored in the second access point 1B. Whether a certain content ID is registered in a Bloom filter or not is verified by testing to see whether or not such bits of the content ID that correspond to the one or more hash values are all "1" in the Bloom filter. When the corresponding bits are all "1", it is determined that the content ID has been registered in the Bloom filter. When at least one of the corresponding bits is "0", it is determined that the content ID has not been registered in the Bloom filter.

Figures 17, 18:
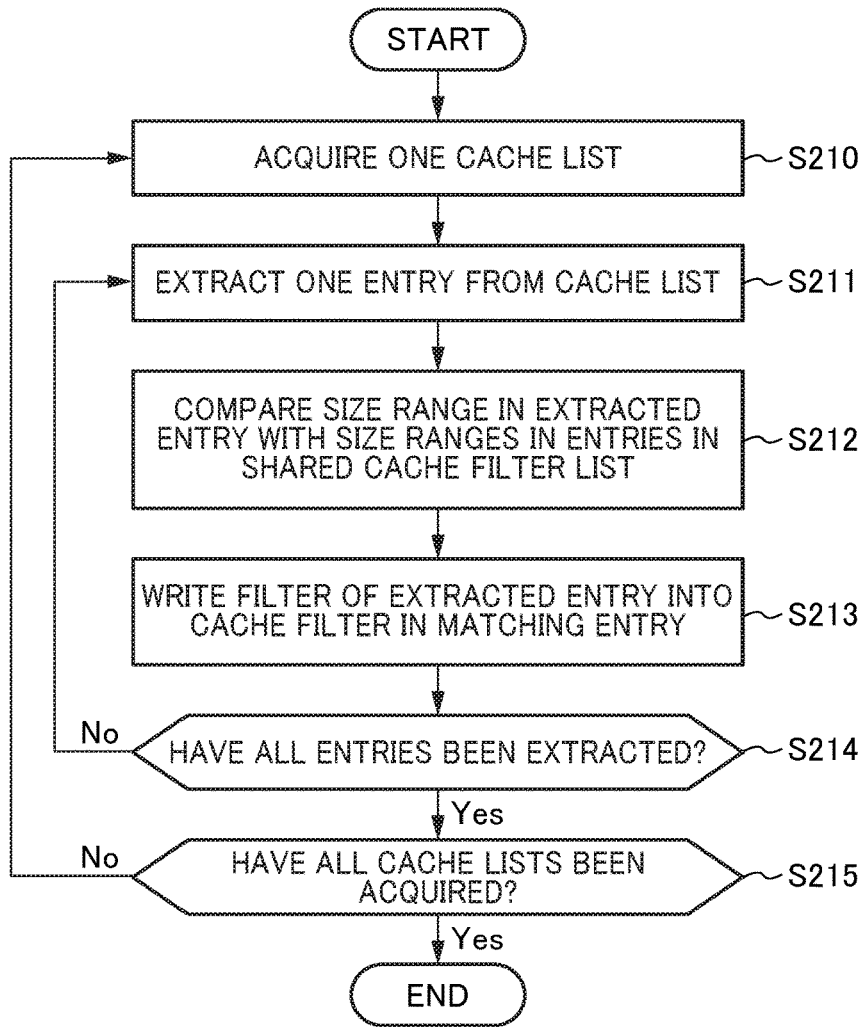
FIG. 17 is a flowchart of generating the shared cache filter list according to the second embodiment.
FIG. 18 is a drawing illustrating an example of a content list according to the second embodiment.

FIG. 17 is a flowchart illustrating an example of the process of generating the shared cache filter list performed by each of the access points. The shared cache filter list generator 18 included in each of the access points generates the shared cache filter list by using the processing flow explained below. In the following explanations, a cache filter in a cache filter list may be referred to as a filter Y, whereas a cache filter in the shared cache filter list may be referred to as a filter X.

First, the shared cache filter list generator 18 acquires one of the cache filter lists stored in the storage 14 (step S210). For example, when the cache filter lists illustrated in FIGS. 14(A) and 14(B) are stored in the storage 14, the shared cache filter list generator 18 acquires the cache filter list illustrated in FIG. 14(A).

Next, the shared cache filter list generator 18 extracts one entry from the acquired cache filter list (step S211). For example, from the acquired cache filter list illustrated in FIG. 14(A), the shared cache filter list generator 18 extracts the entry of Filter 1, i.e., the entry of the cache filter corresponding to the APID "AP1" and to one or more pieces of content of which the content size is equal to or smaller than 10,000,000 bytes.

After that, by comparing the content size in the extracted entry with each of the one or more content size ranges, the shared cache filter list generator 18 specifies the content size range to which the content size belongs (step S212). The one or more content size ranges may be defined for each of the access points. Further, in the present example, it is assumed that the content size ranges in the shared cache filter list (see FIG. 16) and the content size ranges in the cache filter lists (see FIG. 14) are the same among the access points. It should be noted, however, that the content size ranges in the shared cache filter list may be wider than a range including the content size ranges of the cache filter lists. For example, the content size range of the access point 1A in the shared cache filter list may be only one range defining sizes larger than 0 bytes and equal to or smaller than 300,000,000 bytes.

Next, the shared cache filter list generator 18 updates the cache filter (a filter X) corresponding to the content size range specified at step S212 by calculating a logical sum with the cache filter (a filter Y) corresponding to the extracted entry (step S213). For example, when Filter 1 (a filter X) defining content sizes equal to or smaller than 10,000,000 bytes is prepared in the shared cache filter list, because Filter 1 (a filter Y) illustrated in FIG. 14(A) is a filter defining content sizes equal to or smaller than 10,000,000 bytes, Filter 1 fits the filter X. Accordingly, by calculating a logical sum of Filter 1 (the filter Y) illustrated in FIG. 14(A) and the filter in question (the filter X), the shared cache filter list generator 18 writes information about Filter 1 (the filter Y) illustrated in FIG. 14(A) into Filter 1 (the filter X). Written Filter 1 (the filter X) may be Filter 1 illustrated in FIG. 16, for example. Further, because Filter 1 illustrated in FIG. 14(A) is a filter corresponding to the first access point 1A, "AP1" is written under the item "APID" (see FIG. 16).

After that, the shared cache filter list generator 18 judges whether or not all the entries have been extracted from the cache filter list (step S214), When not all the entries have been extracted (step S214: No), the shared cache filter list generator 18 extracts a new entry from the cache filter list. After that, the shared cache filter list generator 18 specifies, from among the shared cache filter list, a cache filter (a filter X) corresponding to the content size range satisfied by the entry and further writes the cache filter (a filter Y) of the extracted entry into the specified filter X (steps S211 through S213).

In contrast, when all the entries have been extracted (step S214: Yes), the shared cache filter list generator 18 subsequently judges whether or not all the cache filter lists have been acquired (step S215). When not all the cache filter lists have been acquired (step S215: No), the shared cache filter list generator 18 acquires a not-yet-acquired cache filter list of an access point from the storage 14 and writes the cache filter (a filter Y) in each of the entries in the acquired cache filter list into a cache filter (a filter X) in a corresponding entry in the shared cache filter list (steps S210 through S214). When the cache filter lists of all the access points have been acquired (step S215: Yes), the process of generating the shared cache filter list is ended.

The process described above is the process performed when there are two access points; however, the number of access points is not limited to two, and it is possible to similarly perform the process in situations where there are three or more access points. In other words, as a result of each of the access points exchanging the information about the cache filters with the other access points, the access points are each able to exchange cache filter lists with all the other access point. Further, when exchanging the cache filter lists, each of the access point may be configured to transmit cache filter lists of the other access points, in addition to transmitting the cache filter list of the own access point.

According to another method, each of the access points may be configured to exchange the cache filter lists, by broadcasting the cache filter list of the own access point to the other access points. As for the timing of the broadcasting, the cache filter list may be broadcasted when another access point is newly added, may be broadcasted periodically, or may be broadcasted when a change is made to the cache filter list, i.e., when any of the stored pieces of cached content is deleted or when an addition is made thereto. Further, the cache filter lists may be exchanged by using this method combined with the method described above.

In the specific example explained with reference to the flowchart in FIG. 17, the content size range of each of the access points used in the shared cache filter list is the same as the content size range used in the cache filter list of each of the access points. In that situation, it is also acceptable to treat a set made up of the cache filter lists of the access points as the shared cache filter list.

Next, a process of providing the additional-information-attached content list will be explained. It is assumed that a connection has been established between the user terminal 2 and the first access point 1A, that the cache filter lists have been exchanged between the first access point 1A and the second access point 1B, and that the shared cache filter lists are stored in the respective storages 14. It is also assumed that an empty band that is usable by the user terminal 2 is set in advance between the first access point 1A and the user terminal 2.

When having received an acquisition request to acquire the additional-information-attached content list from a terminal, the second acquirer of the content acquisition request responder 12 included in the first access point 1A transmits a content list acquisition request to the server 4. An example of the content list is illustrated in FIG. 18. The content list is structured with one or more entries. Each of the entries includes a page ID identifying the page of the content, which may be a URL, for example.

When having received the content list acquisition request from the first access point 1A, the server 4 generates a content list in response to the request and transmits the generated content list to the first access point 1A. When having received the content list, the content acquisition request responder 12 included in the first access point 1A forwards the received content list to the additional-information-attached content list generator 13.

When having received the content list, the additional-information-attached content list generator 13 reads the shared cache filter list from the storage 14 and generates an additional-information-attached content list from the content list and the shared cache filter list. In the following sections, an example of a method for generating the additional-information-attached content list will be explained, with reference to FIGS. 19 and 20.

FIG. 19 is a drawing illustrating an example of the additional-information-attached content list. As illustrated in FIG. 19, the additional-information-attached content list has, with respect to one or more pieces of cached content, one or more entries each including, for example, a page ID, an estimated download time period of the piece of content, an offline playability flag, and one or more APIDs. The additional-information-attached content list has, with respect to one or more pieces of content other than the pieces of cached content, an entry including a page ID. The estimated download time period of the piece of content, the offline playability flag, and the APIDs each correspond to an example of the second information of the present embodiment.

Figure 20:
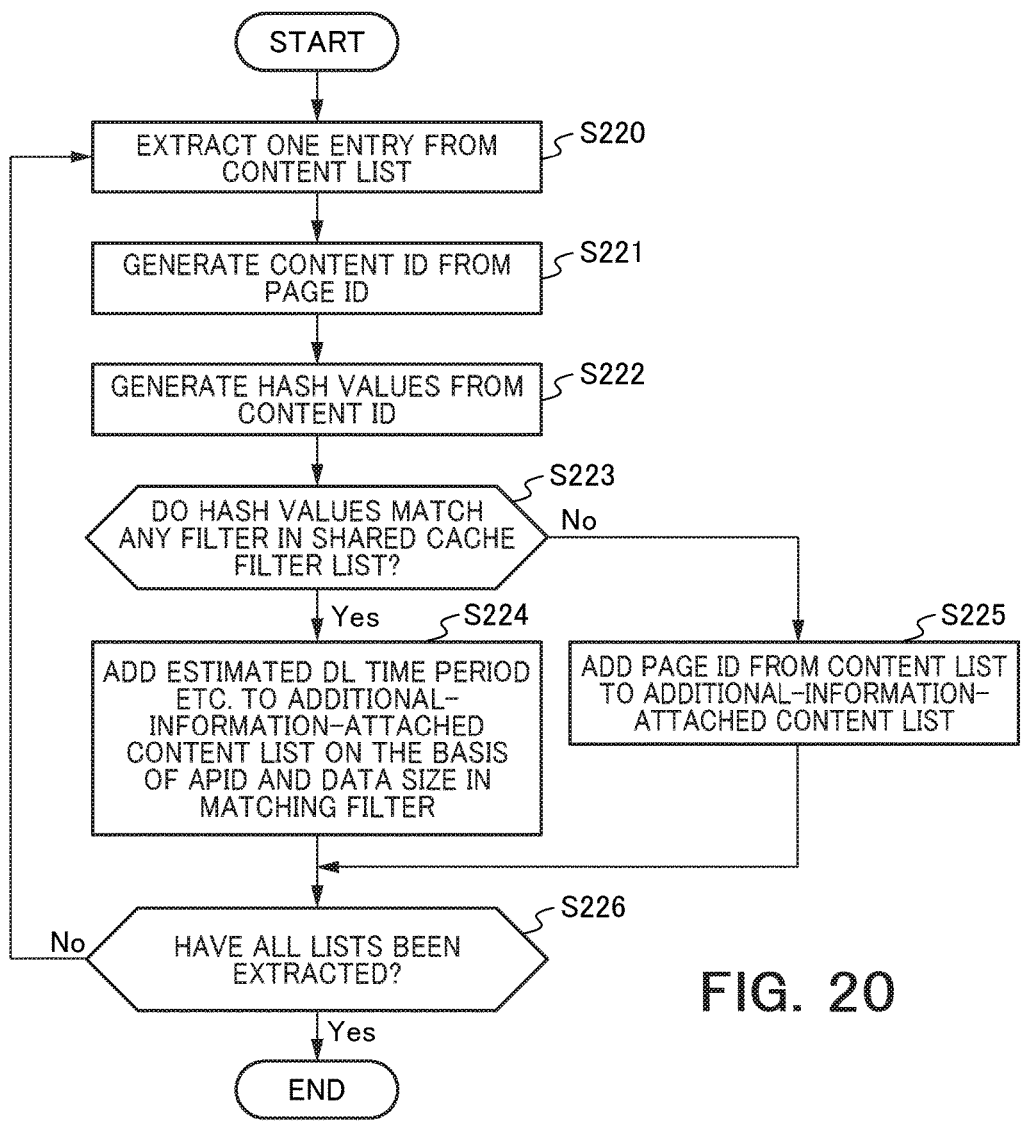
FIG. 20 is a flowchart of generating the additional-information-attached content list according to the second embodiment.

FIG. 20 is a flowchart illustrating a process performed by the additional-information-attached content list generator 13 when generating an additional-information-attached content list. First, the additional-information-attached content list generator 13 extracts one entry from the content list (step S220). For example, the additional-information-attached content list generator 13 extracts the entry having the page ID "http://example.com/page/example1" illustrated in FIG. 18.

Next, the additional-information-attached content list generator 13 generates a content ID from the page ID (step S221). In the present embodiment, the additional-information-attached content list generator 13 generates the content ID by replacing the word "page" included in the page ID with the word "content". However, possible methods for generating the content ID are not limited to this example. The page ID itself may be used as the content ID. As long as it is possible to keep the page ID and the content ID in one-to-one correspondence with each other, it is acceptable to generate the content ID by using any conversion method.

Subsequently, the additional-information-attached content list generator 13 generates one or more hash values from the generated content ID by using one or more hash functions (step S222). In this situation, the hash functions may be those generally used or those originally derived. As explained above, as for the one or more functions being used, either the same hash function or the same set of hash functions is used among the access points.

After that, on the basis of the generated one or more hash values, the additional-information-attached content list generator 13 verifies whether or not the content ID has been registered in any of the cache filters. In other words, the additional-information-attached content list generator 13 judges whether or not the shared cache filter list includes any cache filter in which one or more bits corresponding to the generated one or more hash values are all "1" (step S223).

When the shared cache filter list includes such a cache filter (step S223: Yes), the additional-information-attached content list generator 13 adds, to the additional-information-attached content list, an entry including the page ID corresponding to the content ID, a download time period estimated from the content size range corresponding to the cache filter, an offline playability flag, and the one or more APIDs corresponding to the cache filter (the one or more APIDs of the one or more access points that have cached therein the content identified by the content ID) (step S224).

The method for estimating the download time period may be the same as the method described in the first embodiment. When estimating the download time period, the upper limit value of the content size range may be regarded as the content size. Alternatively, a value of a specific percentage (e.g., 80%) of the upper limit value may be regarded as the content size. In another example, the download time period may be expressed by using a time period range in accordance with the content size range.

In contrast, when the shared cache filter list includes no such cache filter (step S223: No), the additional-information-attached content list generator 13 adds an entry including the page ID corresponding to the generated content ID (i.e., the page ID from which the content ID was generated) to the additional-information-attached content list (step S225). For example, like the entry listed in the bottom row of FIG. 19, the additional-information-attached content list generator 13 adds the page ID "http://example.com/page/example8" to the additional-information-attached content list. The entry does not include an estimated download time period, an offline playability flag, or an APID. However, it is also acceptable to add an estimated download time period and/or an offline non-playability flag (or an offline playability flag if the content is playable offline) to the entry.

Subsequently, the additional-information-attached content list generator 13 judges whether or not all the entries included in the content list have been extracted (step S226). When all the entries included in the content list have been extracted (step S226: Yes), the process of generating the additional-information-attached content list is ended. In contrast, when not all the entries included in the content list have been extracted (step S226: No), the additional-information-attached content list generator 13 extracts the next entry and repeatedly performs the process described above (steps S220 through S225).

When the process of generating the additional-information-attached content list has been completed, the additional-information-attached content list generator 13 transmits the additional-information-attached content list to the user terminal 2 as a response. Having received the additional-information-attached content list, the user terminal 2 displays the received additional-information-attached content list on its screen. By referring to the additional-information-attached content list displayed on the screen, with respect to each of the pieces of content, the user is able to judge whether or not it is possible to play back the piece of content offline (whether or not it is possible to download the content), to predict the time period required to download the piece of content, and the like. In this situation, the user is able to determine that any piece of content having no items other than the page ID is a piece of content that needs to be downloaded from the server and that any piece of content having the items other than the page ID has been cached into an access point.

Next, an operation to provide the content will be explained. When having received a content acquisition request including a page ID from the user terminal 2, the first access point 1A calculates a content ID corresponding to the page ID and checks the cache status of the piece of content on the basis of the content ID. In accordance with the result of the check process, the first access point 1A acquires the piece of content from the storage 14, the other access point, or the server 4 and further transmits the acquired piece of content to the user terminal 2. In this manner, the first access point 1A responds to the acquisition request from the user terminal 2.

Figure 21:
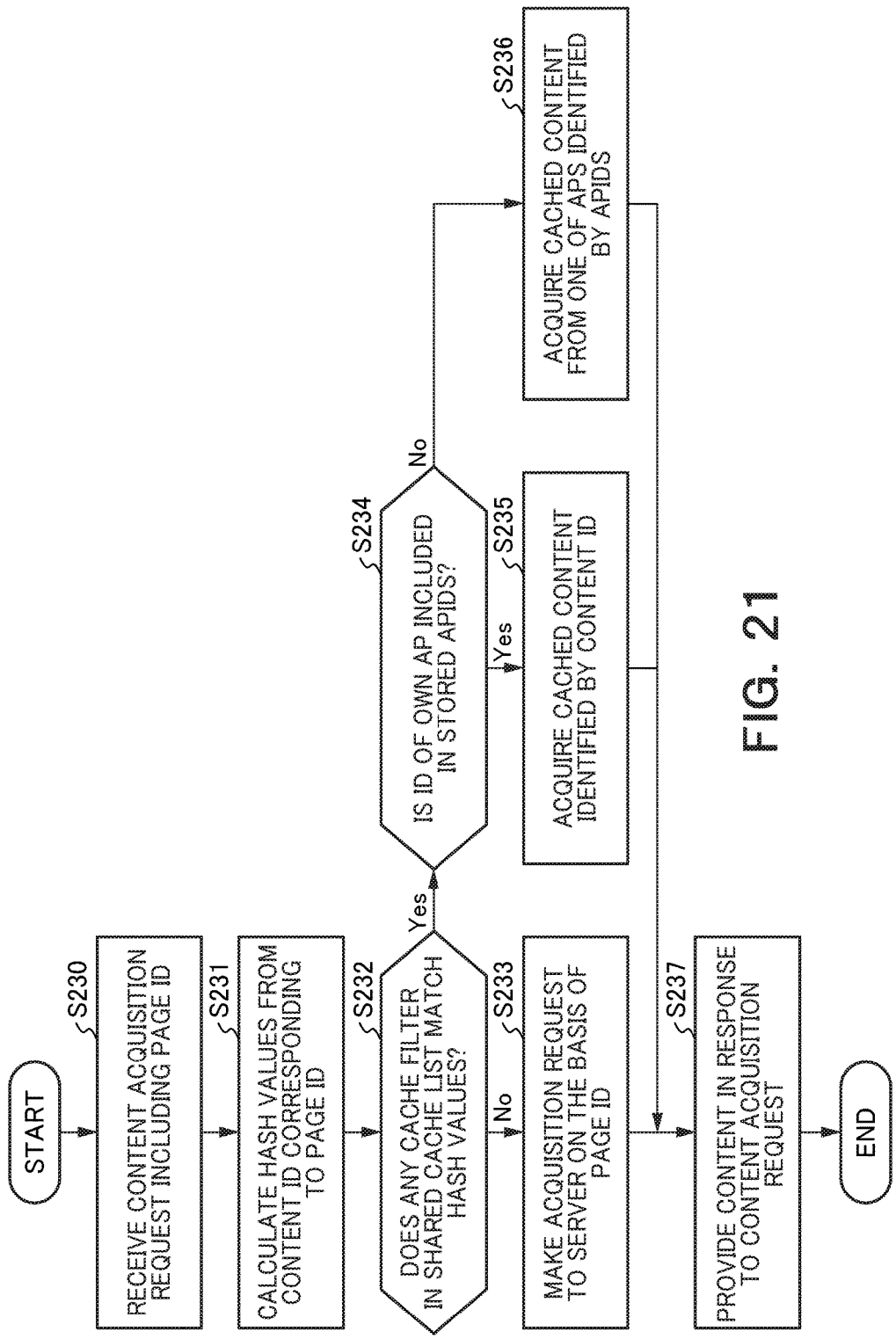
FIG. 21 is a flowchart of providing content according to the second embodiment.

FIG. 21 is a flowchart illustrating a process in the operation to provide the content. First, the first access point 1A receives a content acquisition request including a page ID from the user terminal 2 (step S230).

Next, the content provider included in the content acquisition request responder 12 calculates a content ID from the received page ID and further calculates one or more hash values from the content ID (step S231). To calculate the one or more hash values, the content provider uses the same hash function or the same set of hash functions as explained above.

Subsequently, the content provider reads the cache filters in the shared cache filter list stored in the storage 14 and judges whether or not there is any cache filter in which the bits corresponding to the hash values are all "1", by comparing the hash values with the cache filters (step S232). In other words, the content provider verifies to see whether or not the content ID has been registered with respect to each of the cache filters.

When there is no such cache filter (step S232: No), the content provider performs an acquisition request on the basis of the page ID to the server serving as a distribution source of the content and further acquires the content from the server 4 (step S233). In that situation, the first access point 1A may cache the content into the storage 14 and update the cache filter list.

In contrast, when there is at least one such cache filter, i.e., when the shared cache filter list includes one or more cache filters in each of which the bits corresponding to the above-mentioned hash values are all "1" (step S232: Yes), the content provider judges whether or not the APIDs corresponding to the one or more cache filters include an APID matching the APID of the own access point (step S234). In the present embodiment, the content provider judges whether or not the APIDs include "AP1", which is the APID of the first access point 1A.

When the APID of the own access point is included (step S234: Yes), the content provider searches the storage 14 of the own access point for the piece of cached content corresponding to the content ID (step S235).

In contrast, when the APID of the own access point is not included (step S234: No), the content provider reads one of the APIDs corresponding to the one or more cache filters and further transmits a cached content acquisition request to the access point corresponding to the read APID, so as to acquire the piece of cached content from the access point (step S236). In that situation, when there are two or more APIDs to be read, one of the APIDs that requires the shortest time period to acquire the piece of content may be selected. Alternatively, the APID of such an access point that will use bands in upper-level communication channels as little as possible may be selected. In another example, the acquired piece of content may be cached into the storage 14 of the own access point. In that situation, the cache filter list may be updated. Another arrangement is also acceptable in which a piece of content is cached after the acquisition request for the same piece of content has been received a certain number of times.

When the preparation for providing the piece of content has been finished, the first access point 1A transmits the piece of content to the user terminal 2 as a response to the content acquisition request (step S237).

As explained above, according to the present embodiment, when the content acquisition request is received from the user terminal 2, using the Bloom filters makes it possible to determine at a high speed which access point has the requested content cached therein. Further, it is possible to reduce the amount of information transmitted and received between the access points.

Further, similarly to the first embodiment, it is also acceptable even when there are two or more bitrate versions with respect to a single piece of content. In that situation, similarly to the first embodiment, the configuration of the entries in the cache filter list may be changed. Further, the shared cache filter list (see FIG. 16) does not necessarily have to store therein the information about the other access point. The shared cache filter list may store therein only the information about the access point storing the information. In that situation, because only the APID of the storing access point is included under the item "APID" of the shared cache filter list, the item "APID" may be omitted.

Next, the following describes a process performed by an access point when a change has occurred in the cache information, e.g., a process performed when the cache information has been updated for the reason that a new piece of cached content has been added or that an old piece of cached content has been deleted. In that situation, the cache filter list is updated on the basis of the updated cache information. After that, the updated cache filter list is transmitted to the other access point by a broadcast transmission. In another example, the most up-to-date cache filter list may be transmitted by a broadcast transmission once every predetermined period of time, instead of the cache filter list being transmitted at the times when the cache filter list updated.

Instead of being transmitted with the timing described above, the cache filter list may be transmitted at the time when a content acquisition request is made by the user terminal 2. In another example, the cache filter list may be transmitted at the time when a cache filter list acquisition request is made by the other access point.

Third Embodiment

In the first and the second embodiments described above, the communication device according to the embodiments of the present invention is installed in each of the access points. However, it is also possible to install a part or all of the functions of the communication device in the controller 3 or the server 4. It is also possible to realize a separate device having a part or all of the functions of the communication device.

As a first example, an example will be explained in which a part or all of the functions of the communication device is aggregated into the controller 3. In the present example, the controller 3 includes the shared cache information generator 11 and is configured to generate the shared cache information. In that situation, each of the access points transmits the cache information to the controller 3, in response to a push notification from the server 4 or a cache information acquisition request from the controller 3.

The controller 3 receives the cache information from all the access points belonging to the node itself and generates shared cache information from the received pieces of cache information. Further, the controller 3 transmits the generated shared cache information to each of all the access points. The shared cache information may be transmitted from the controller 3 to each of the access points by unicast transmissions or may be transmitted to all of the access points altogether by a broadcast transmission.

Similarly, the shared cache filter list according to the second embodiment may be generated by the controller 3. Each of the access points may transmit the cache filter list instead of the cache information, so that the controller 3 generates the shared cache filter list from the cache filter lists received from the access points and further transmits the generated shared cache filter list to each of the access points.

Alternatively, the controller 3 may generate the cache filter list from the cache information of each of the access points and transmit the cache filter lists to each of the access points. In that situation, each of the access points receives the cache filter lists of all the access points and generates the shared cache filter list on the basis of the received cache filter lists. Alternatively, the shared cache filter list may be generated by the controller 3.

As explained above, by aggregating a part of the functions of the access points according to the first and the second embodiment into the controller 3, it is possible to centralize the processes. It is therefore possible to reduce the loads on each of the access points.

As a second example, an example will be explained in which a part or all of the functions of the communication device is aggregated into the server 4. The server 4 transmits an acquisition request for necessary information (the cache information, the cache filter lists, or the like) to the controller 3, so that the controller 3 acquires the requested information from each of the access points and further transmits the acquired information to the server 4. Alternatively, the controller 3 may collect the information voluntarily and transmit the collected information to the server 4 without receiving a request from the server 4. Similarly to the controller 3 in the first example described above, the server 4 generates the shared cache information or generates the shared cache filter list, for example, and further distributes either the generated shared cache information or the generated shared cache filter list to each of the access points via the controller 3.

As a third example, an example will be explained in which a separate device having a part or all of the functions of the communication device is realized.

Figure 22:
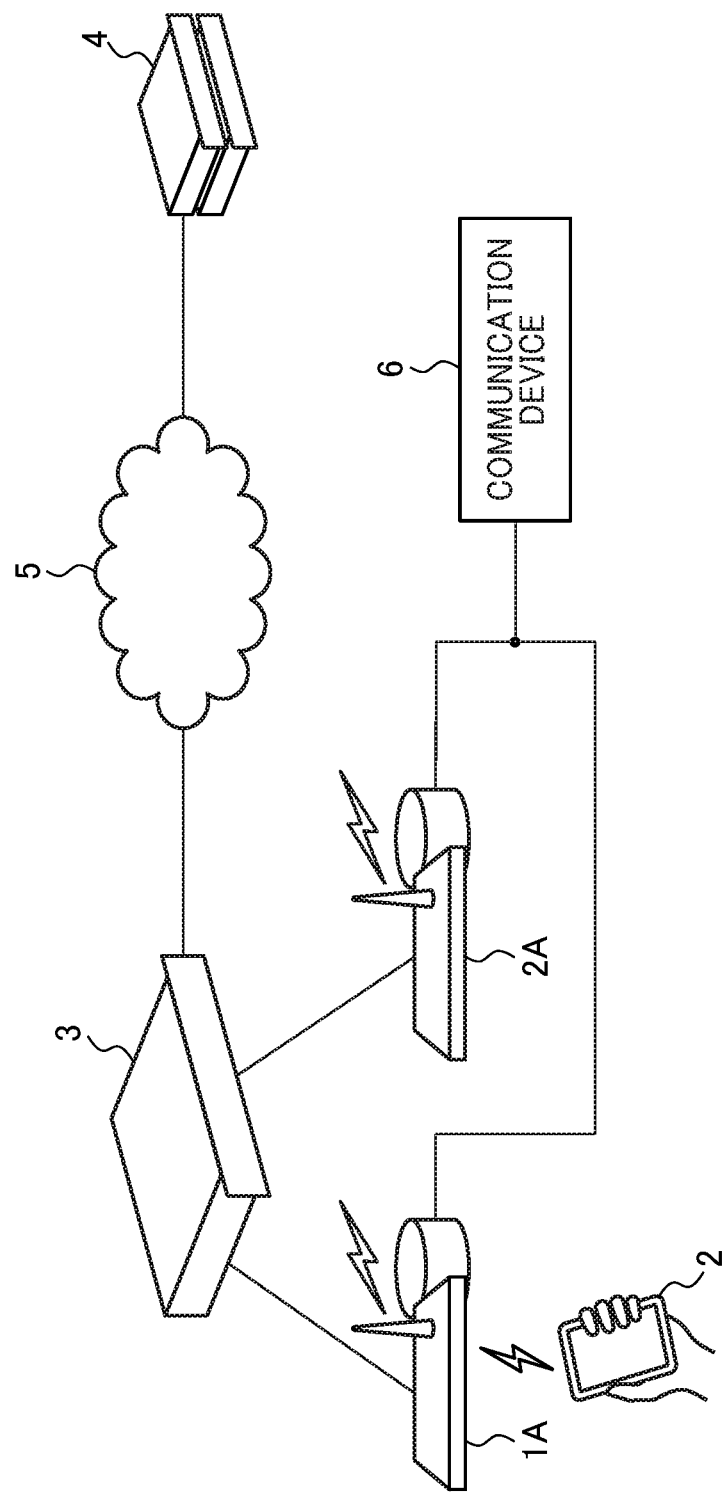
FIG. 22 is a drawing illustrating an example of a communication system according to a third embodiment.

FIG. 22 is a drawing illustrating an example of a communication system according to a third embodiment. A communication device 6 is connected to the access points 1A and 1B in a wired or wireless manner. The communication device 6 has the same functions as those of the communication devices installed in the access points in the first and the second embodiments. The communication device 6 is capable of communicating with the access points 1A and 1B. In that situation, it is sufficient when the access points 1A and 1B each have the functions of an access point provided in a generally-used wireless LAN. By aggregating the functions installed in the access points in the first and the second embodiment into the communication device 6, it is possible to centralize the processes. It is therefore possible to reduce the loads on the access points. Alternatively, it is also acceptable to install the functions aggregated in the controller 3 or the server 4 in the first or the second example explained above into the communication device 6, so that the remaining functions are installed in each of the access points.

Hereby, the communication device of each of the embodiments (the access point, the controller or the server) is able to be implemented, for example, by using a general-purpose computer device as basic hardware. Thus, each of the functions in the computer device has can be implemented by causing a processor installed on the computer device described above to execute a program. In this case, the communication device may be implemented by installing the program described above to the computer device beforehand or may be implemented by storing to a storage medium such as CD-R, distributing the program described above through a network and installing this program in the computer device as appropriate. Moreover, the storage device can be implemented by using a memory device or a hard disk incorporated in or externally added to the computer device described above or a storage medium such as CD-R, CD-RW, DVD-RAM or DVD-R as appropriate.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core. Moreover, the term "circuitry" may refer one or more electric circuits disposed on a single chip, or may refer one or more electric circuits disposed on a plurality of chips or a plurality of devices in a dispersed manner.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

The term "storage" may encompass any device which can permanently memorize data by magnetic technology, optical technology or non-volatile memory. For example, the storage may be an HDD, an optical disc, an SDD or the like.

The present invention is not limited to the above described embodiments as they are, and constituent elements can be substantiated with deformation within a range not deviating from the gist thereof in a practical phase. Various inventions can be formed by appropriate combinations of the plurality of constituent elements disclosed in the above described embodiments. For example, some constituent elements can be deleted from all the constituent elements shown in the embodiments, and the elements across the different embodiments can be appropriately combined.

The invention claimed is:

1. A communication device corresponding to one of a plurality of relay devices, the communication device comprising:
   communication circuitry configured to communicate with other relay devices than the one relay device and communicate with a server, the server storing a plurality of pieces of content therein;
   hardware storage configured to cache one or more pieces of content; and
   processing circuitry configured to:
   transmit a first acquisition request to the other relay devices to acquire first information indicative of one or more pieces of content cached in the other relay devices;
   transmit a second acquisition request to the server to acquire a first content list including identifiers of the plurality of pieces of content stored in the server;
   check whether each of the pieces of content identified by the first content list is cached in which of the relay devices based on the first information; and
   generate a second content list which comprises:
   a set of:
   an identifier of the piece of content cached in at least one of the relay devices; and
   second information, the second information including an identifier of the at least one of the relay devices caching the piece of content; and
   a set of:
   an identifier of the piece of content cached in none of the relay devices and third information, the third information indicating that the piece of content is cached in none of the relay devices, wherein:
   the communication circuitry is configured to transmit the second content list to a user terminal,
   the communication circuitry receives an acquisition request to specify one of the pieces of content identified by the second content list from the user terminal,
   the processing circuitry reads out a piece of content identified by the acquisition request from the hardware storage and sends the piece of content to the user terminal when the piece of content identified by the acquisition request is cached in the hardware storage,
   the processing circuitry communicates with one of the other relay devices to acquire the piece of content identified by the acquisition request and sends the piece of content to the user terminal when the piece of content identified by the acquisition request is not cached in the hardware storage and is cached in the one of the other relay devices,
   the processing circuitry caches the piece of content acquired from the one of the other relay devices in the hardware storage when the piece of content identified by the acquisition request is not cached in the hardware storage and is cached in the one of the other relay devices,
   the processing circuitry communicates with the server to acquire the piece of content identified by the acquisition request from the server and sends the piece of content to the user terminal when the piece of content identified by the acquisition request is cached in none of the hardware storage and the other relay devices and
   the processing circuitry caches the piece of content acquired from the server in the hardware storage when the piece of content identified by the acquisition request is cached in none of the hardware storage and the other relay devices.

2. The communication device according to claim 1, wherein the second information includes information indicative of a length of an estimated time period required to send the piece of content identified by the second information to the user terminal.

3. The communication device according to claim 1, wherein the second information includes information indicative of price of the piece of content identified by the second information.

4. The communication device according to claim 1, wherein
the second information includes information indicative of points to be awarded when the piece of content identified by the second information is provided for the user.

5. The communication device according to claim 1, wherein the second information includes information indicative of whether the piece of content identified by the second information is able to be downloaded to the user terminal for playback in the user terminal.

6. The communication device according to claim 1, wherein the first information includes Bloom filters for the relay devices, each of the Bloom filters including a bit vector representing identifiers of one or more pieces of content that are cached in each of the relay devices, and
the processing circuitry determines whether the piece of content has been cached in which of the relay devices by testing an identifier of the piece of content against each of the Bloom filters.

7. The communication device according to claim 1, wherein the communication circuitry transmits the second content list to the plurality of relay devices.

8. A communication method performed by an electronic apparatus corresponding to one of a plurality of relay devices, the method comprising:
communicating with other relay devices than the one relay device and with a server, the server storing a plurality of pieces of content therein;
caching one or more pieces of content in a hardware storage;
transmitting a first acquisition request to the other relay devices to acquire first information indicative of one or more pieces of content cached in the other relay devices;
transmitting a second acquisition request to the server to acquire a first content list including identifiers of the pieces of content stored in the server;
checking whether each of the pieces of content identified by the first content list is cached in which of the plurality of relay devices based on the first information;
generating a second content list which comprises:
a set of:
an identifier of the piece of content cached in at least one of the relay devices; and
second information, the second information including an identifier of the at least one of the relay devices caching the piece of content; and
a set of:
an identifier of the piece of content cached in none of the relay devices and third information, the third information indicating that the piece of content is cached in none of the relay devices;
transmitting the second content list to a user terminal;
receiving an acquisition request to specify one of the pieces of content identified by the second content list from the user terminal;
reading out a piece of content identified by the acquisition request from hardware storage and sending the piece of content to the user terminal when the piece of content identified by the acquisition request is cached in the hardware storage;
communicating with one of the other relay devices to acquire the piece of content identified by the acquisition request and sending the piece of content to the user terminal when the piece of content identified by the acquisition request is not cached in the hardware storage and is cached in the one of the other relay devices;
caching the piece of content acquired from the one of the other relay devices in the hardware storage when the piece of content identified by the acquisition request is not cached in the hardware storage and is cached in the one of the other relay devices,
communicating with the server to acquire the piece of content identified by the acquisition request from the server and sending the piece of content to the user terminal when the piece of content identified by the acquisition request is cached in none of the hardware storage and the other relay devices, and
the processing circuitry caches the piece of content acquired from the server in the hardware storage when the piece of content identified by the acquisition request is cached in none of the hardware storage and the other relay devices.

9. A non-transitory computer readable medium, having a computer program stored therein which, when executed by a computer corresponding to one of a plurality of relay devices being able to communicate with each other, causes the computer to perform processing comprising:
communicating with other relay devices than the one relay device and with a server, the server storing a plurality of pieces of content therein;
caching one or more pieces of content in a hardware storage;
transmitting a first acquisition request to the other relay devices to acquire first information indicative of one or more pieces of content cached in the other relay devices;
transmitting a second acquisition request to the server to acquire a first content list including identifiers of the pieces of content stored in the server;
checking whether each of the pieces of content identified by the first content list is cached in which of the plurality of relay devices based on the first information;
generating a second content list which comprises:
a set of:
an identifier of the piece of content cached in at least one of the relay devices; and
second information, the second information including an identifier of the at least one of the relay devices caching the piece of content; and
a set of:
an identifier of the piece of content cached in none of the relay devices and third information, the third information indicating that the piece of content is cached in none of the relay devices;
transmitting the second content list to a user terminal;
receiving an acquisition request to specify one of the pieces of content identified by the second content list from the user terminal;
reading out a piece of content identified by the acquisition request from hardware storage and sending the piece of content to the user terminal when the piece of content identified by the acquisition request is cached in the hardware storage;
communicating with one of the other relay devices to acquire the piece of content identified by the acquisition request and sending the piece of content to the user terminal when the piece of content identified by the acquisition request is not cached in the hardware storage and is cached in the one of the other relay devices;

caching the piece of content acquired from the one of the other relay devices in the hardware storage when the piece of content identified by the acquisition request is not cached in the hardware storage and is cached in the one of the other relay devices, communicating with the server to acquire the piece of content identified by the acquisition request from the server and sending the piece of content to the user terminal when the piece of content identified by the acquisition request is cached in none of the hardware storage and the other relay devices, and the processing circuitry caches the piece of content acquired from the server in the hardware storage when the piece of content identified by the acquisition request is cached in none of the hardware storage and the other relay devices.

\* \* \* \* \*